(12) United States Patent
Osada

(10) Patent No.: US 8,044,800 B2
(45) Date of Patent: Oct. 25, 2011

(54) SEMICONDUCTOR DEVICE

(75) Inventor: Takeshi Osada, Isehara (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 282 days.

(21) Appl. No.: 11/976,782

(22) Filed: Oct. 29, 2007

(65) Prior Publication Data

US 2008/0111702 A1 May 15, 2008

(30) Foreign Application Priority Data

Nov. 14, 2006 (JP) ................................. 2006-307298

(51) Int. Cl.
*G08B 13/14* (2006.01)
(52) U.S. Cl. ............. 340/572.1; 340/572.4; 340/539.13; 340/636.1; 340/636.19
(58) Field of Classification Search ............... 340/572.1, 340/572.4, 636.1, 636.2, 825.36, 10.1, 10.3
See application file for complete search history.

(56) References Cited

U.S. PATENT DOCUMENTS

| | | | |
|---|---|---|---|
| 6,470,002 B1 * | 10/2002 | Jones et al. .................... 370/345 |
| 6,567,005 B2 * | 5/2003 | Curwen et al. ............. 340/573.4 |
| 6,937,144 B2 * | 8/2005 | Drake et al. .................. 340/447 |
| 7,116,230 B2 * | 10/2006 | Klowak ................. 340/572.1 |
| 7,178,727 B2 * | 2/2007 | Yoked et al. .................. 235/383 |
| 7,333,072 B2 | 2/2008 | Yamazaki et al. |
| 7,394,382 B2 * | 7/2008 | Nitzan et al. ................ 340/572.8 |
| 7,495,558 B2 * | 2/2009 | Pope et al. .................. 340/572.1 |
| 7,518,692 B2 | 4/2009 | Yamazaki et al. |
| 7,525,434 B2 * | 4/2009 | Batra ........................ 340/572.1 |
| 7,652,359 B2 | 1/2010 | Takayama et al. |
| 2005/0248455 A1 * | 11/2005 | Pope et al. ............... 340/539.27 |
| 2006/0001525 A1 | 1/2006 | Nitzan et al. |
| 2006/0012464 A1 * | 1/2006 | Nitzan et al. ................ 340/10.1 |
| 2006/0114102 A1 * | 6/2006 | Chang et al. ................ 340/10.1 |
| 2007/0024425 A1 * | 2/2007 | Nitzan et al. ................ 340/10.1 |
| 2007/0184851 A1 * | 8/2007 | Barnwell et al. ............ 455/456.1 |

FOREIGN PATENT DOCUMENTS

JP 2004-021612 1/2004
JP 2005-316724 11/2005

OTHER PUBLICATIONS

Chinese Office Action (Application No. 200710186400.6) Dated Mar. 9, 2011.

\* cited by examiner

*Primary Examiner* — Daniel Wu
*Assistant Examiner* — Son M Tang
(74) *Attorney, Agent, or Firm* — Eric J. Robinson; Robinson Intellectual Property Law Office, P.C.

(57) ABSTRACT

A semiconductor device with a built-in battery whose residual amount of the electrical energy can be detected accurately. The semiconductor device has a battery, a demodulation circuit, a control circuit which generates a signal having information about the residual amount of the electrical energy stored in the battery, and a transmission medium which displays the residual amount of the electrical energy in accordance with the signal. The demodulation circuit demodulates a signal input from an antenna which requests display of the residual amount of the electrical energy. Based on the demodulated signal, the control circuit starts to generate a signal having information about the residual amount of the electrical energy in the battery.

9 Claims, 19 Drawing Sheets

SEMICONDUCTOR DEVICE

BACKGROUND OF THE INVENTION

1. Field of the Invention

The present invention relates to a semiconductor device that can communicate via radio waves.

2. Description of the Related Art

A technique to communicate signals by noncontact (RFID: Radio Frequency Identification) between a reader and a medium (ID tag) incorporating an antenna and an integrated circuit has become commonplace in various fields, and the further market expansion is expected as a new communication form. Although in many cases the shape of an ID tag for use in RFID is a card shape or a chip shape which is smaller than a card, various types of shapes are employed depending on the intended use of the ID tag.

With RFID, an ID tag and a reader can communicate with each other using radio waves. Specifically, radio waves radiated from the reader is converted into an electric signal in the antenna inside the ID tag, and the integrated circuit in the ID tag operates in response to the electric signal. Then, signals can be transmitted to the reader in noncontact by modulated radio waves being radiated from the antenna in accordance with the electric signals output from the integrated circuit.

Note that the ID tag is divided into two types: An ID tag with a built-in battery, and a batteryless ID tag. The Batteryless ID tag generates required electric power each time by converting radio waves from the reader into electrical energy. Therefore, when radiation of radio waves from the reader stops, supply of electrical energy to the integrated circuit which ID tag has also stops. On the other hand, the ID tag with a built-in battery ensures a certain level of electrical energy which is required for driving the integrated circuit by the battery incorporated in the ID tag.

Reference 1 (Japanese Published Patent Application No. 2005-316724) discloses a technique related to the ID tag with a built-in primary battery. Further, Reference 2 (Japanese Published Patent Application No. 2004-021612) discloses a technique related to an ID tag with a built-in secondary battery.

SUMMARY OF THE INVENTION

As described above, in the ID tag with a built-in battery, the integrated circuit can be kept operated as long as electrical energy is stored in the battery. Thus, in continuous use of the ID tag with a built-in battery, to know the residual amount of the electrical energy stored in the battery is important. This is because in the case of ID tag with a built-in primary battery, to change the battery or to replace the ID tag itself is needed in battery exhaustion. Also, there may be a case that the battery can not be changed immediately after the operation of the ID tag has stopped at unexpected timing. Further, the same can be said for the ID tag with a built-in secondary battery. Electrical energy may not be supplied to the secondary battery promptly according to circumstances in use. Thus, to know the residual amount of the electrical energy stored in the battery is very important as with the case of the primary battery.

However, there is a problem that usually detecting the accurate residual amount of the electrical energy in the battery from outside of the ID tag is impossible. It is possible to guess the residual amount of the electrical energy in the battery by estimating the amount of power consumption of the ID tag. However, since the amount of power consumption differs depending on time or conditions to use the ID tag, it is difficult to guess the accurate residual amount of the electrical energy in the battery.

Additionally, the ID tag with the built-in battery becomes unresponsive to signals from a reader when electrical energy of the built-in battery runs out. In this case, there is a problem in that it is difficult for users to distinguish at first glance whether the reason of unresponsive state is battery exhaustion, or other reasons such as having a bad reception of radio waves or the reader failure.

As a common problem regardless of with or without a battery, in the case where a plurality of physical objects exist, detecting location information of the objects using the ID tag is difficult. While employing the ID tag is very effective in obtaining location information of a physical object, detecting location information of only the specific physical object promptly among a plurality of physical objects, is difficult.

With the foregoing problems in consideration, it is an object the present invention to provide a semiconductor device with a built-in battery in which the residual amount of the electrical energy can be detected accurately. Another object of the present invention is to provide a semiconductor device that can be, when its operation has stopped from battery exhaustion, determined easily that reason for the operation stop is the battery exhaustion without confusing with other factors. Still another object of the present invention is to provide a semiconductor device that can detect location information of a physical object, even if there is a plurality of physical objects.

A semiconductor device having a primary structure of the present invention includes: a battery, a control circuit configured to receive a signal having information about the residual amount of the electrical energy stored in the battery, and a transmission medium configured to transmit the residual amount of the electrical energy in accordance with the signal. Transmission of the residual amount of the electrical energy can be implemented either until battery exhaustion or only after the semiconductor device has received a request from the reader with radio waves. In this case, the semiconductor device having the primary structure of the present invention has a demodulation circuit in addition to the battery, the control circuit, and the transmission medium. The demodulation circuit can demodulate a signal input from an antenna, which requests transmission of the residual amount of the electrical energy stored in the battery. Additionally, the control circuit can start to generate a signal having information about the residual amount of the electrical energy in the battery in accordance with the demodulated signal.

The semiconductor device having the primary structure of the present invention may have either a primary battery or a secondary battery as a battery. In the case of using a secondary battery, the semiconductor device of the present invention may additionally have a rectifier circuit. When the rectifier circuit is used, a signal input from the antenna is rectified to generate DC voltage, so that the secondary battery can store electric energy.

A transmission medium in the semiconductor device having the primary structure of the present invention is a medium which can transmit the residual amount of the electrical energy in the battery to the user of the semiconductor device or other devices prepared separately without depending on electrical signals. As a way of transmission, a method to appeal to the five senses such as sight or hearing of the user can be used. In addition, as the way of transmission, it is also possible to use a method in which a special device can read a information such as invisible light represented by ultraviolet light and infrared light, and elastic waves whose frequency is outside of an audible frequency range typified by ultrasound and infrasonic sound, although these are not directly perceived by the five senses of human beings.

The semiconductor device having the primary structure of the present invention may include a load which can receive and consume electrical energy stored in the battery. As the load, an integrated circuit which operates in accordance with a signal supplied by radio waves, sensors, and various types of devices can be used.

A semiconductor device having a secondary structure of the present invention includes: a rectifier circuit configured to generate DC voltage by rectifying AC voltage input from an antenna, a control circuit configured to generate a signal having information about the level of the DC voltage, and a transmission medium configured to transmit a communication distance between the ID tag and the reader indirectly by using the signal. When electric power of radio waves transmitted from a reader is constant, the level of DC voltage generated in the rectifier circuit is big as the communication distance between the ID tag and the reader is short. On the contrary, as the communication distance is long, the level of DC voltage is low. Therefore, the level of DC voltage tells a relative distance between the ID tag and the reader indirectly.

In addition, the semiconductor device having the secondary structure of the present invention can always transmit a communication distance; however, it can transmit the communication distance only after the semiconductor device has received a request. In this case, the semiconductor device having the secondary structure of the present invention has a demodulation circuit in addition to the rectifier circuit, the control circuit, and the transmission medium. The demodulation circuit can demodulate a signal, input from the antenna, which requests transmission of the communication distance. Then, in accordance with a demodulated signal, the control circuit can start to generate a signal having the level of DC voltage generated in the rectifier circuit as information, in other words, a signal which has information about the communication distance.

The transmission medium, in the semiconductor device having the secondary structure of the present invention, is a medium which can transmit the communication distance to the user of the semiconductor device or other devices prepared separately without depending on an electrical signal. As with the case of the semiconductor device having the primary structure of the present invention, a method to appeal to the five senses such as sight or hearing of a user can be used as the way of transmission. In addition, as a way of transmission, it is also possible to use a method in which a special device can read information such as invisible light represented by ultraviolet light and infrared light, and elastic waves whose frequency is outside of an audible frequency range typified by ultrasound and infrasonic sound, although these are not directly perceived by the five senses of human beings.

The semiconductor device having the secondary structure of the present invention may include a load which can receive and consume DC voltage generated in the rectifier circuit. As the load, an integrated circuit which operates in accordance with a signal supplied by radio waves, sensors, and various types of devices can be used.

Note that the semiconductor devices having the primary and the secondary structures of the present invention may or may not include the antenna. It is acceptable as long as the semiconductor device of the present invention can operate in accordance with a signal requesting transmission of the residual amount of the electrical energy which is received by the antenna.

With the primary structure of the present invention, the residual amount of the electrical energy in the battery can be detected accurately from outside of the semiconductor device by transmitting the residual amount of the electrical energy in the battery to the transmission medium. Thus, smooth performance of a task is not disturbed by battery exhaustion of the semiconductor device at unexpected timing.

In addition, with the primary structure of the present invention, the transmission medium stops transmitting the residual amount of the electrical energy in the battery at battery exhaustion of the semiconductor device. Thus, users can easily know battery exhaustion, when the semiconductor device is not responsive to signals from the reader because of battery exhaustion.

Additionally, with the secondary structure of the present invention, distance between the reader and the semiconductor device can be determined in relative manner. With use of location information of the semiconductor device to the reader, the location information of only a particular physical object can be promptly detected, even if there is a plurality of physical objects.

DETAILED DESCRIPTION OF THE INVENTION

Although the present invention is fully described by way of embodiment modes and embodiments with reference to the accompanying drawings, it is to be understood that various changes and modifications will be apparent to those skilled in the art. Therefore, unless such changes and modifications depart from the spirit and the scope of the present invention, they should be construed as being included therein.

Embodiment Mode 1

Figure 1:
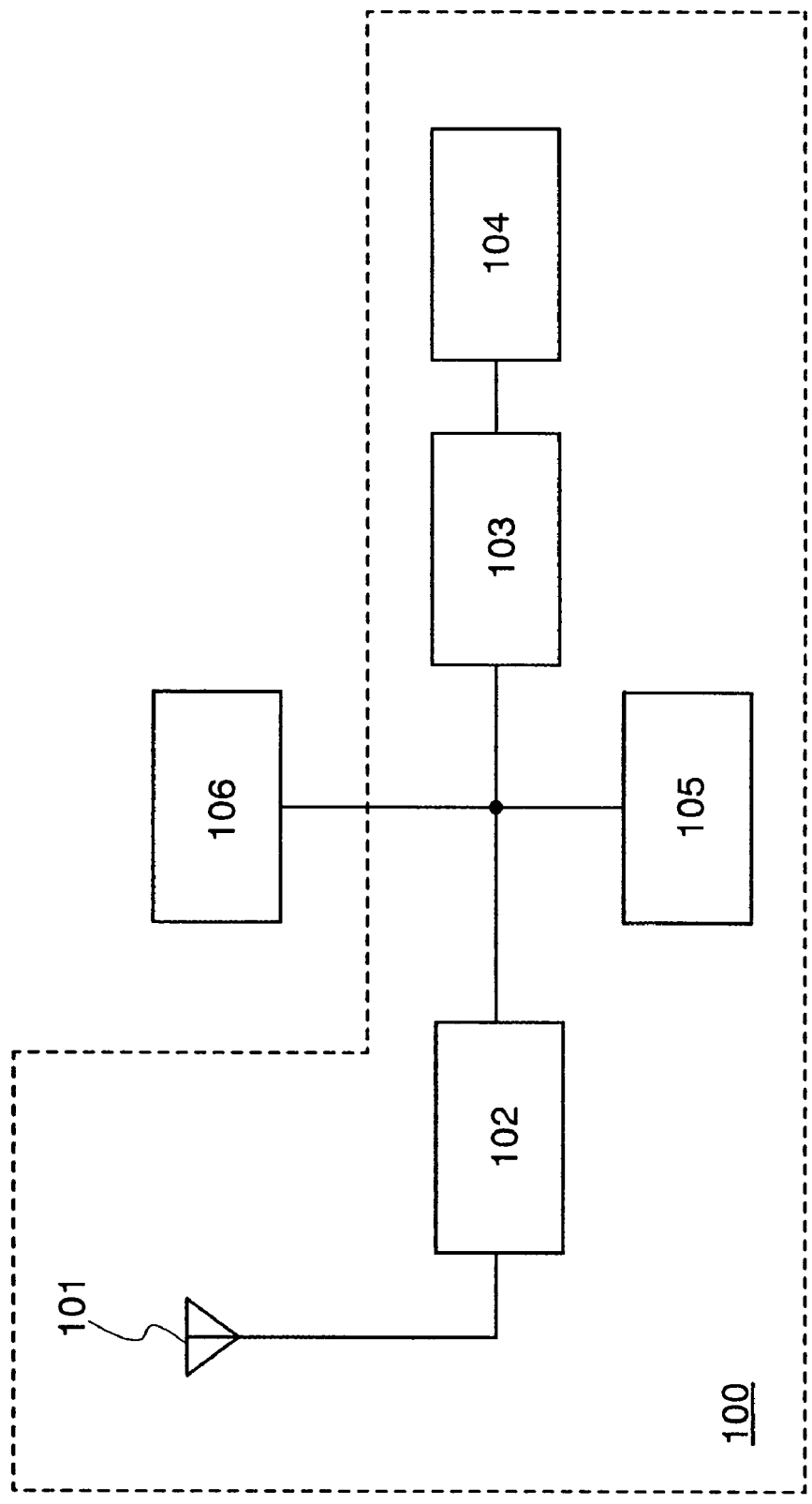
FIG. 1 is a block diagram illustrating a structure of a semiconductor device of the present invention.

First, a structure of a semiconductor device of the present invention will be described with reference to FIG. 1. FIG. 1 is a block diagram of semiconductor device having the primary structure of the present invention and a primary battery. A semiconductor device 100 in this embodiment mode includes an antenna 101, a demodulation circuit 102, a control circuit 103, a transmission medium 104, and a primary battery 105. The demodulation circuit 102 and the control circuit 103 correspond to an integrated circuit.

A load 106 consumes electrical energy stored in the primary battery 105. Further, not only the load 106, but also the integrated circuit typified by the demodulation circuit 102 and the control circuit 103, and the transmission medium 104 consume the electrical energy stored in the primary battery 105. Note that an ID tag, a sensor, and various types of devices can be used as the load 106. The semiconductor device 100 of the present invention can include the load 106 within the structure. For instance, a pressure sensor, a temperature sensor, a humidity sensor, an optical sensor, an odor sensor, an audio sensor, and the like can be employed as the sensor.

It is assumed that a signal which requests transmission of the residual amount of the electrical energy stored in the primary battery 105 is transmitted with radio waves from the reader. The antenna 101 receives the radio waves, generates an electric signal having AC voltage, and outputs the signal to the demodulation circuit 102. The demodulation circuit 102 demodulates the electric signal input from the antenna 101 and outputs it to the control circuit 103 of a next stage. The control circuit 103 detects a voltage output from the primary battery 105 in accordance with a signal input from the demodulation circuit 102. Using the voltage, the control circuit 103 generates a signal containing information about the residual amount of the electrical energy in the primary battery 105, and then inputs the signal to the transmission medium 104.

The transmission medium 104 relatively transmits the residual amount of the electrical energy in the primary battery 105 in accordance with the input signal. As the way to transmit the residual amount of the electrical energy, a method to appeal to the five senses such as sight or hearing of the user can be used. For example, a visual transmission method using a light-emitting element, a liquid crystal, an electronic ink, or the like, and an audio transmission method using a speaker which converts an electric signal into sound may be used. In addition, it is also possible to use a method in which a special device can read the residual amount of the electrical energy, although it can not be directly perceived by the five senses of human beings. As examples, invisible light represented by ultraviolet light and infrared light, and elastic waves whose frequency is outside of an audible frequency range typified by ultrasound and infrasonic sound are given.

In this embodiment mode, the residual amount of the electrical energy in the primary battery 105 can be detected accurately even from outside of the semiconductor device 100 by transmitting the residual amount of the electrical energy in the primary battery 105 to the transmission medium 104. Thus, smooth performance of a task is not disturbed by battery exhaustion of the primary battery 105 at unexpected timing.

Note that in FIG. 1 illustrates the case where the residual amount of the electrical energy is transmitted in accordance with a request from the reader; however, the residual amount of the electrical energy may constantly be transmitted without a request from the reader. In this case the antenna 101 and the demodulation circuit 102 are not necessary. Thus, the structure of the semiconductor device 100 can be simplified. Furthermore, in this instance, the residual amount of the electrical energy in the primary battery 105 is not automatically transmitted by the transmission medium 104 in exhaustion of the primary battery 105 within the semiconductor device 100. Thus, users can easily know battery exhaustion, when the semiconductor device 100 is not responsive to signals from the reader because of battery exhaustion.

Note that communication between the semiconductor device 100 and the reader can be carried out by using various frequencies of radio waves such as 125 kHz, 13.56 MHz, 950 MHz, and 2.45 GHz. There are various modulation methods such as an amplitude modulation, a frequency modulation, a phase modulation, and the like; however, the present invention is not particularly limited to these. Further, transmission methods of signals with radio waves can be classified into various kinds such as an electromagnetic coupling method, an electromagnetic induction method, a micro-wave method, and the like, depending on a wavelength of a carrier. In the present invention, the foregoing transmission methods can be used.

Although the structure of the semiconductor device 100 which include the antenna 101 is described in this embodiment mode, the semiconductor device of the present invention does not necessary have the antenna.

Embodiment Mode 2

Figure 2:
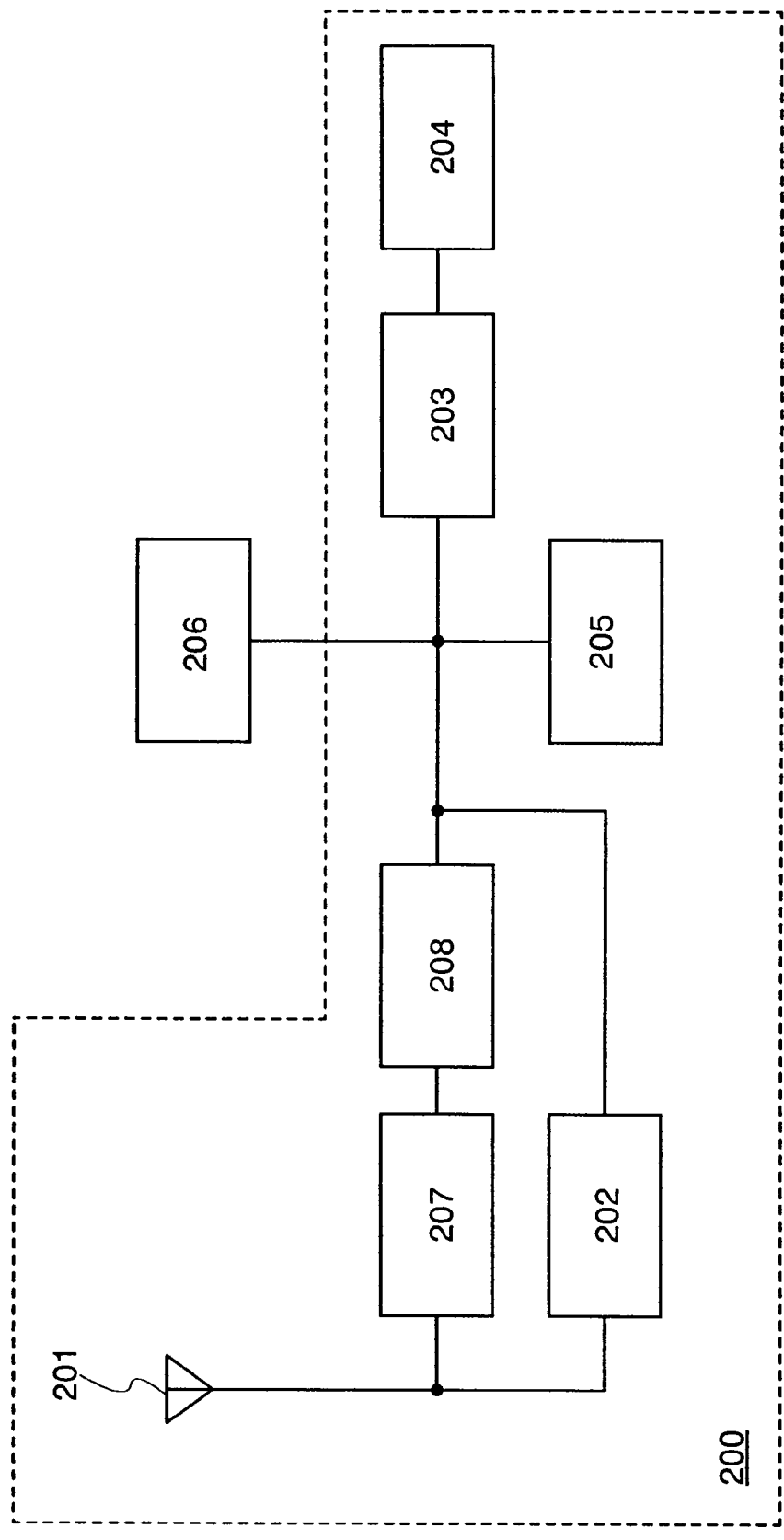
FIG. 2 is a block diagram illustrating a structure of a semiconductor device of the present invention.

A structure of a semiconductor device of the present invention will be described with reference to FIG. 2. FIG. 2 is a block diagram of the semiconductor device having the primary structure of the present invention and the secondary battery. A semiconductor device 200 in this embodiment mode includes an antenna 201, a demodulation circuit 202, a control circuit 203, a transmission medium 204, a secondary battery 205, a rectifier circuit 207, and a charging circuit 208. The demodulation circuit 202, the control circuit 203, the rectifier circuit 207, and the charging circuit 208 correspond to an integrated circuit.

A load 206 consumes electrical energy stored in the secondary battery 205. Further, not only the load 206, but also the integrated circuit typified by the demodulation circuit 202, the control circuit 203, the rectifier circuit 207, and the charging circuit 208, and the transmission medium 204 consume the electrical energy stored in the secondary battery 205. Note that an ID tag, a sensor, and various types of devices can be used as the load 206. The semiconductor device of the present invention can include the load within the structure. For instance, a pressure sensor, a temperature sensor, a humidity sensor, an optical sensor, an odor sensor, an audio sensor, and the like can be employed as the sensor.

It is assumed that a signal which requests transmission of the residual amount of the electrical energy stored in the secondary battery 205 is transmitted with radio waves from the reader. The antenna 201 receives the radio waves, generates an electric signal having AC voltage, and outputs the signal to the demodulation circuit 202. The demodulation circuit 202 demodulates the electric signal input from the antenna 201 and outputs it to the control circuit 203 of a next stage. The control circuit 203 detects the voltage output from the secondary battery 205 in accordance with a signal input from the demodulation circuit 202. Using the voltage, the control circuit 203 generates a signal containing information about the residual amount of the electrical energy in the secondary battery 205, and then inputs the signal to the transmission medium 204.

The transmission medium 204 relatively transmits the residual amount of the electrical energy in the secondary battery 205 in accordance with the input signal. As the way to transmit the residual amount of the electrical energy, a method to appeal to the five senses such as sight or hearing of the user can be used. For example, a visual transmission method using a light-emitting element, a liquid crystal, an electronic ink, or the like, and an audio transmission method using a speaker which converts an electric signal into sound may be used. In addition, it is also possible to use a method in which a special device can read the residual amount of the electrical energy, although it can not be directly perceived by the five senses of human beings. As examples, invisible light represented by ultraviolet light and infrared light, and elastic waves whose frequency is outside of an audible frequency range typified by ultrasound and infrasonic sound are given.

On the other hand, the rectifier circuit 207 rectifies input AC voltage to generate DC voltage for power supply. The charging circuit 208 generates current on the basis of the DC voltage for the power supply generated in the rectifier circuit 207, and charges the secondary battery 205. The charging circuit 208 can be constructed from a regulator and a switching circuit. The secondary battery 205 prevented from being overcharged by using a diode for the above switching circuit; however, a circuit which controls the charging circuit for suppressing overcharge may be provided separately. In addition, a constant voltage circuit or a constant current circuit may be used as the charging circuit 208.

In this embodiment mode, the residual amount of the electrical energy in the secondary battery 205 can be detected accurately even from outside of the semiconductor device 200 by transmitting the residual amount of the electrical energy in the secondary battery 205 to the transmission medium 204. Thus, smooth performance of a task is not disturbed by battery exhaustion of the secondary battery 205 at unexpected timing.

Note that in FIG. 2 illustrates the case where the residual amount of the electrical energy is transmitted in accordance with a request from the reader; however, the residual amount of the electrical energy may be transmitted without a request from the reader. In this case the antenna 201 and the demodulation circuit 202 are not necessary. Thus, the structure of the semiconductor device 200 can be simplified. Furthermore, in this instance, the residual amount of the electrical energy in the secondary battery 205 is not automatically transmitted by the transmission medium 204 in exhaustion of the secondary battery 205 within the semiconductor device 200. Thus, users can easily know battery exhaustion, when the semiconductor device 200 is not responsive to signals from the reader because of battery exhaustion.

Although the case of using the secondary battery is described in this embodiment mode, a capacitor may be used instead of the secondary battery.

Note that communication between the semiconductor device 200 and the reader can be carried out by using various frequencies of radio waves such as 125 kHz, 13.56 MHz, 950 MHz, and 2.45 GHz. There are various modulation methods such as an amplitude modulation, a frequency modulation, a phase modulation, and the like; however, the present invention is not particularly limited to these. Further, transmission methods of a signal with radio waves can be classified into various kinds such as an electromagnetic coupling method, an electromagnetic induction method, a micro-wave method, and the like, depending on the wavelength of a carrier. In the present invention, the foregoing transmission methods can be used.

Although the structure of the semiconductor device 200 which includes the antenna 201 is described in this embodiment mode, the semiconductor device of the present invention does not necessary have the antenna.

Embodiment Mode 3

Figure 3:
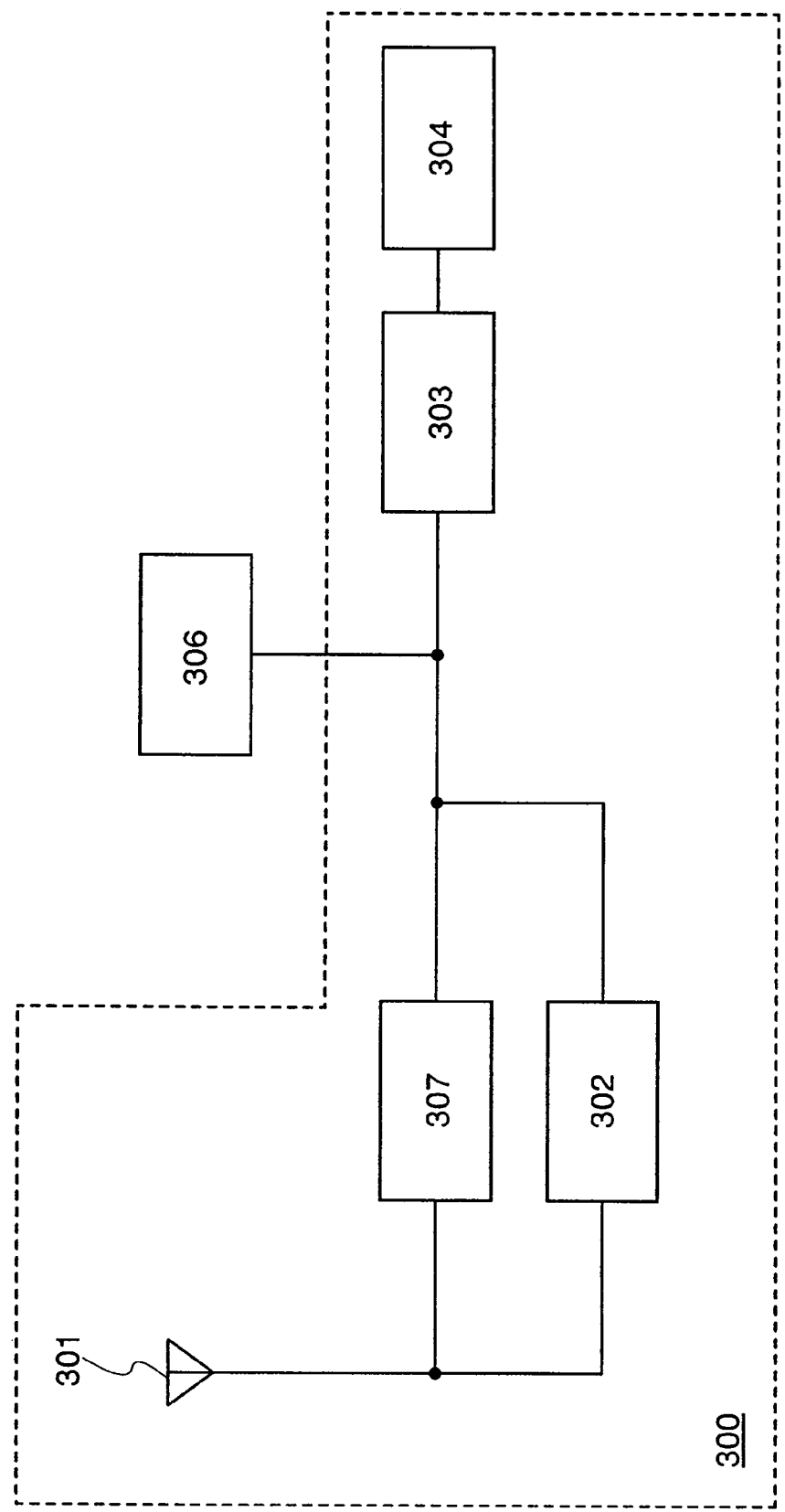
FIG. 3 is a block diagram illustrating a structure of a semiconductor device of the present invention.

A structure of a semiconductor device of the present invention will be described with reference to FIG. 3. FIG. 3 is a block diagram of the semiconductor device having the secondary structure of the present invention. A semiconductor device 300 in this embodiment mode includes an antenna 301, a demodulation circuit 302, a control circuit 303, a transmission medium 304, and a rectifier circuit 307. The demodulation circuit 302, the control circuit 303, and the rectifier circuit 307 correspond to an integrated circuit.

It is assumed that a signal which requests transmission of location information of the semiconductor device is transmitted with radio waves from a reader. The antenna 301 receives radio waves, generates an electric signal having AC voltage, and outputs it to the demodulation circuit 302 and the rectifier circuit 307. The demodulation circuit 302 demodulates the electric signal input from the antenna 301 and outputs it to the control circuit 303 of a next stage. Meanwhile, the rectifier circuit 307 rectifies the input electrical signal to generate DC voltage for power supply and outputs it to the control circuit 303 of a next stage.

The control circuit 303 detects the DC voltage input from the rectifier circuit 307 in accordance with the signal input from the demodulation circuit 302 and starts to generate a signal having information about a level of the DC voltage. The signal is input into the transmission medium 304. The transmission medium 304 transmits a relative level of the DC voltage for power supply in accordance with the input signal. A level of the DC voltage generated in the rectifier circuit corresponds to a relative communication distance between the ID tag and the reader. Thus, by transmitting the relative level of DC voltage for power supply from the transmission medium 304, communication distance between the semiconductor device and the reader can be transmitted indirectly.

As the way to transmit the communication distance, a method to appeal to the five senses such as sight or hearing of the user can be used. For example, a visual transmission method using a light-emitting element, a liquid crystal, an electronic ink, or the like, and an audible transmission method using a speaker which converts an electric signal into sound may be used. In addition, it is also possible to use a method which a special device can read the information, although it can not be directly perceived by the five senses of human beings. As examples, invisible light represented by ultraviolet light and infrared light, and elastic waves whose frequency is outside of an audible frequency range typified by ultrasound and infrasonic sound are given.

A load 306 can consume the DC voltage for power supply generated in the rectifier circuit 307 as electrical energy. Further, not only the load 306, but also the integrated circuit typified by the demodulation circuit 302, the control circuit 303, and the rectifier circuit 307, and the transmission medium 304 consume the DC voltage for power supply generated in the rectifier circuit 307 as electrical energy. The level of the DC voltage for power supply consumed as electrical energy may be kept constant with a regulator or the like before the DC voltage is supplied to the integrated circuit. Note that an ID tag, a sensor, and various types of devices can be used as the load 306. The semiconductor device of the present invention can include the load within the structure. For instance, a pressure sensor, a temperature sensor, a humidity sensor, an optical sensor, an odor sensor, an audio sensor, and the like can be employed as the sensor.

In this embodiment mode, it is possible to determine the communication distance between the semiconductor device and the reader. Therefore, the location information of only a particular physical object can be promptly detected, even if there is a plural physical objects.

In addition, by placing readers on three or more different points of location to measure the distance between the readers and an ID tag, location information of an object in two-dimensional space can be obtained. Further, by placing readers on four or more different points of location to measure the distance between the readers and an ID tag, location information of an object in three-dimensional space can also be obtained.

Note that in FIG. 3 illustrates the case where location information of the semiconductor device is transmitted in accordance with a request from the reader; however, the location information of the semiconductor device may constantly be transmitted without a request from the reader. In this case the demodulation circuit 302 is not necessary. Thus, the structure of the semiconductor device 300 can be simplified.

In addition, this embodiment mode describes the structure of a semiconductor device without a battery; however, the present invention is not limited to this structure. The semiconductor device shown in this embodiment mode may additionally have a battery. Note that a charging circuit is provided in the case where the battery is a secondary battery or a capacitor.

Note that communication between the semiconductor device 300 and the reader can be carried out by using various frequencies of radio waves such as 125 kHz, 13.56 MHz, 950 MHz, and 2.45 GHz. There are various modulation methods such as an amplitude modulation, a frequency modulation, a phase modulation, and the like; however, the present invention is not particularly limited to these. Further, transmission methods of a signal with radio waves can be classified into various kinds such as an electromagnetic coupling method, an electromagnetic induction method, a micro-wave method, and the like, depending on the wavelength of a carrier. In the present invention, the foregoing transmission methods can be used.

Although the structure of the semiconductor device 300 which includes the antenna 301 is described in this embodiment, the semiconductor device of the present invention does not necessary have the antenna.

Embodiment Mode 4

This embodiment mode will describe a structure of semiconductor of the present invention in the case where an ID tag is used as the load 106 in Embodiment Mode 1.

Figure 4:
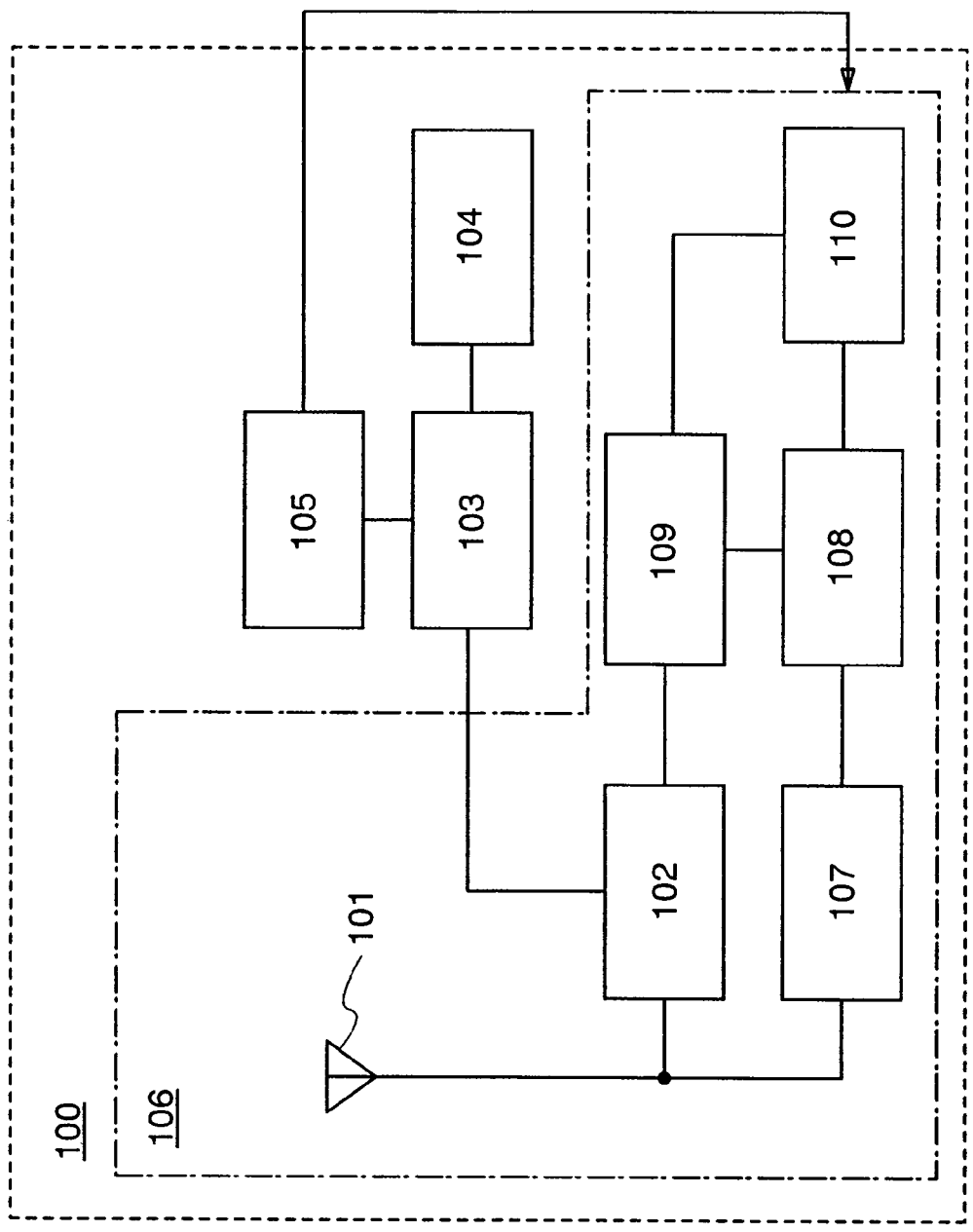
FIG. 4 is a block diagram illustrating a structure of a semiconductor device of the present invention.

FIG. 4 is a block diagram of the semiconductor device of this embodiment mode. The semiconductor device 100 in this embodiment mode includes the antenna 101, the demodulation circuit 102, the control circuit 103, the transmission medium 104, the primary battery 105, a modulation circuit 107, an encoder 108, a signal generation circuit 109, and a memory 110. The demodulation circuit 102, the control circuit 103, the transmission medium 104, the modulation circuit 107, the encoder 108, the signal generation circuit 109, and the memory 110 correspond to an integrated circuit. Moreover, the load 106 includes the antenna 101, the demodulation circuit 102, the modulation circuit 107, the encoder 108, the signal generation circuit 109, and the memory 110.

Note that, in this embodiment mode, one demodulation circuit 102 combines the functions of the demodulation circuit of the ID tag corresponding to the load 106 and the demodulation circuit of the semiconductor device 100; however, the present invention is not limited to the structure. A demodulation circuit which the semiconductor device 100 should normally have may be provided separately, aside from the demodulation circuit which the load 106 has. Furthermore, in this embodiment mode, one antenna 101 combines the functions of the antenna of the ID tag corresponding to the load 106 and the antenna of the semiconductor device 100; however, the present invention is not limited to the structure. An antenna of the semiconductor device 100 may be provided separately, aside from the antenna which the load 106 has.

Electrical energy stored in the primary battery 105 can be supplied to the demodulation circuit 102, the control circuit 103, the transmission medium 104, the primary battery 105, the modulation circuit 107, the encoder 108, the signal generation circuit 109, and the memory 110.

In this embodiment mode, AC voltage input from the antenna 101 is demodulated in the demodulation circuit 102, and is also input into the signal generation circuit 109 of a next stage, separately from the control circuit 103. The signal generation circuit 109 generates a signal by arithmetic processing in accordance with the signal input from the demodulation circuit 102. In the foregoing arithmetic processing, the memory 110 can be used as a primary cache memory or a secondary cache memory. The signal generated in the signal generation circuit 109 is output to the modulation circuit 107 after encoded in the encoder 108. The modulation circuit 107 applies load modulation to the antenna 101 in accordance with the signal. The radio waves generated upon application of the load modulation to the antenna 101 are received by the reader, whereby the reader can receive the signal from the signal generation circuit 109.

In this embodiment mode, the residual amount of the electrical energy in the primary battery 105 can be detected accurately even from outside of the semiconductor device 100 by transmitting the residual amount of the electrical energy in the primary battery 105 to the transmission medium 104. Thus, smooth performance of a task is not disturbed by battery exhaustion of the primary battery 105 at unexpected timing.

Note that in FIG. 4 illustrates the case where the residual amount of the electrical energy in accordance with a request from the reader; however, the residual amount of the electrical energy may constantly be transmitted without a request from the reader. In this instance, the residual amount of the electrical energy in the primary battery 105 is not automatically transmitted by the transmission medium 104 in exhaustion of the primary battery 105 within the semiconductor device 100. Thus, users can easily know battery exhaustion, when the semiconductor device 100 is not responsive to signals from the reader because of battery exhaustion.

Note that communication between the semiconductor device 100 and the reader can be carried out by using various frequencies of radio waves such as 125 kHz, 13.56 MHz, 950 MHz, and 2.45 GHz. There are various modulation methods such as an amplitude modulation, a frequency modulation, a phase modulation, and the like; however, the present invention is not particularly limited to these. Further, transmission methods of a signal with radio waves can be classified into various kinds such as an electromagnetic coupling method, an electromagnetic induction method, a micro-wave method, and the like, depending on the wavelength of a carrier. In the present invention, the foregoing transmission methods can be used.

Although the structure of the semiconductor device 100 which includes the antenna 101 is described in this embodiment mode, the semiconductor device of the present invention does not necessary have the antenna.

Embodiment Mode 5

This embodiment mode will describe a structure of a semiconductor device of the present invention in the case where an ID tag is used as the load 206 in the Embodiment Mode 2.

Figure 5:
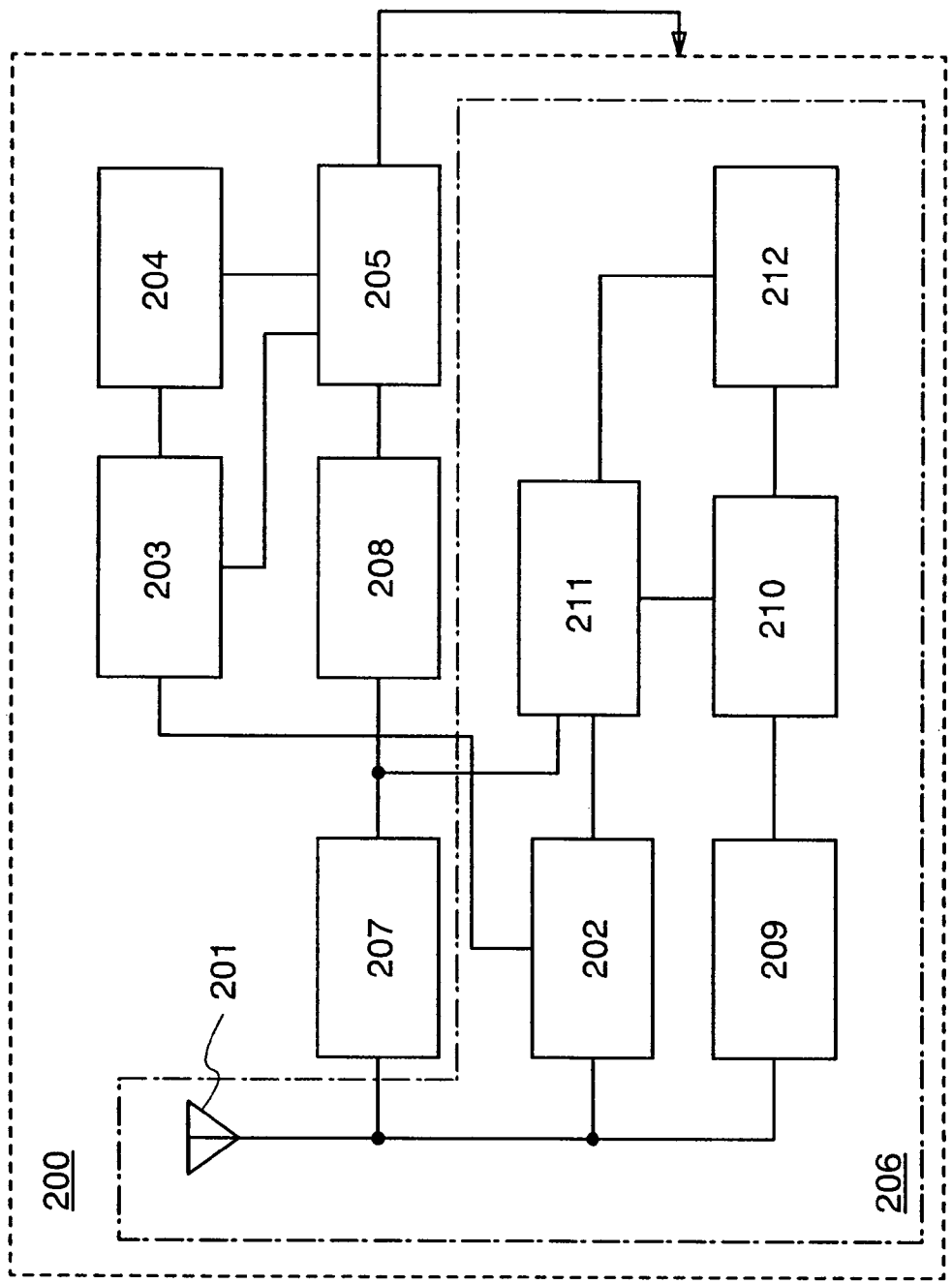
FIG. 5 is a block diagram illustrating a structure of a semiconductor device of the present invention.

FIG. 5 is a block diagram of the semiconductor device of this embodiment mode. The semiconductor device 200 in this embodiment mode includes the antenna 201, the demodulation circuit 202, the control circuit 203, the transmission medium 204, the secondary battery 205, the rectifier circuit 207, the charging circuit 208, the modulation circuit 209, an encoder 210, a signal generation circuit 211, and a memory 212. The demodulation circuit 202, the control circuit 203, the rectifier circuit 207, the charging circuit 208, the modulation circuit 209, the encoder 210, the signal generation circuit 211, and the memory 212 correspond to the integrated circuit. Moreover, the load 206 includes the antenna 201, the demodulation circuit 202, the modulation circuit 209, the encoder 210, the signal generation circuit 211, and the memory 212.

Note that, in this embodiment mode, one demodulation circuit 202 combines the functions of the demodulation circuit of the ID tag corresponding to the load 206 and the demodulation circuit of the semiconductor device 200; however, the present invention is not limited to the structure. The demodulation circuit which the semiconductor device 200 should normally have may be provided separately, aside from the demodulation circuit which the load 206 has. Furthermore, in this embodiment mode, one antenna 201 combines the functions of the antenna of the ID tag corresponding to the load 206 and the antenna of the semiconductor device 200; however, the present invention is not limited to the structure. The antenna of the semiconductor device 200 may be provided separately, aside from the antenna which the load 206 has.

Electrical energy stored in the secondary battery 205 can be supplied to the demodulation circuit 202, the control circuit 203, the rectifier circuit 207, the charging circuit 208, the modulation circuit 209, the encoder 210, the signal generation circuit 211, and the memory 212.

In this embodiment mode, AC voltage input from the antenna 201 is demodulated in the demodulation circuit 202, and is also input into the signal generation circuit 211 of a next stage, separately from the control circuit 203. The signal generation circuit 211 generates a signal by arithmetic processing in accordance with the signal input from the demodulation circuit 202. In foregoing arithmetic processing, the memory 212 can be used as a primary cache memory or a secondary cache memory. The signal generated in the signal generation circuit 211 is output to the modulation circuit 209 after encoded in the encoder 210. The modulation circuit 209 applies load modulation to the antenna 201 in accordance with the signal. The radio waves generated upon application of the load modulation to the antenna 201 are received by the reader, whereby the reader can receive the signal from the signal generation circuit 211.

In this embodiment mode, the residual amount of the electrical energy in the secondary battery 205 can be detected accurately even from outside of the semiconductor device 200 by transmitting the residual amount of the electrical energy in the secondary battery 205 to the transmission medium 204. Thus, smooth performance of a task is not disturbed by battery exhaustion of the secondary battery 205 at unexpected timing.

Note that in FIG. 5 illustrates the case where the residual amount of the electrical energy in accordance with a request from the reader; however, the residual amount of the electrical energy may constantly be transmitted without a request from the reader. In this instance, the residual amount of the electrical energy in the secondary battery 205 is not automatically transmitted by the transmission medium 204 in exhaustion of the secondary battery 205 within the semiconductor device 200. Thus, users can easily know battery exhaustion, when the semiconductor device 200 is not responsive to signals from the reader because of battery exhaustion.

Although the case of using the secondary battery is described in this embodiment, a capacitor may be used instead of the secondary battery.

Note that, communication between the semiconductor device 200 and the reader can be carried out by using various frequencies of radio waves such as 125 kHz, 13.56 MHz, 950 MHz, and 2.45 GHz. There are various modulation methods such as an amplitude modulation, a frequency modulation, a phase modulation, and the like; however, the present invention is not particularly limited to these. Further, transmission methods of a signal with radio waves can be classified into various kinds such as an electromagnetic coupling method, an electromagnetic induction method, a micro-wave method, and the like, depending on the wavelength of a carrier. In the present invention, the foregoing transmission methods can be used.

Although the structure of the semiconductor device 200 which includes the antenna 201 is described in this embodiment mode, the semiconductor device of the present invention does not necessary have the antenna.

Embodiment Mode 6

This embodiment mode will describe a structure of a semiconductor device of the present invention in the case where an ID tag is used as the load 306 in Embodiment Mode 3.

Figure 6:
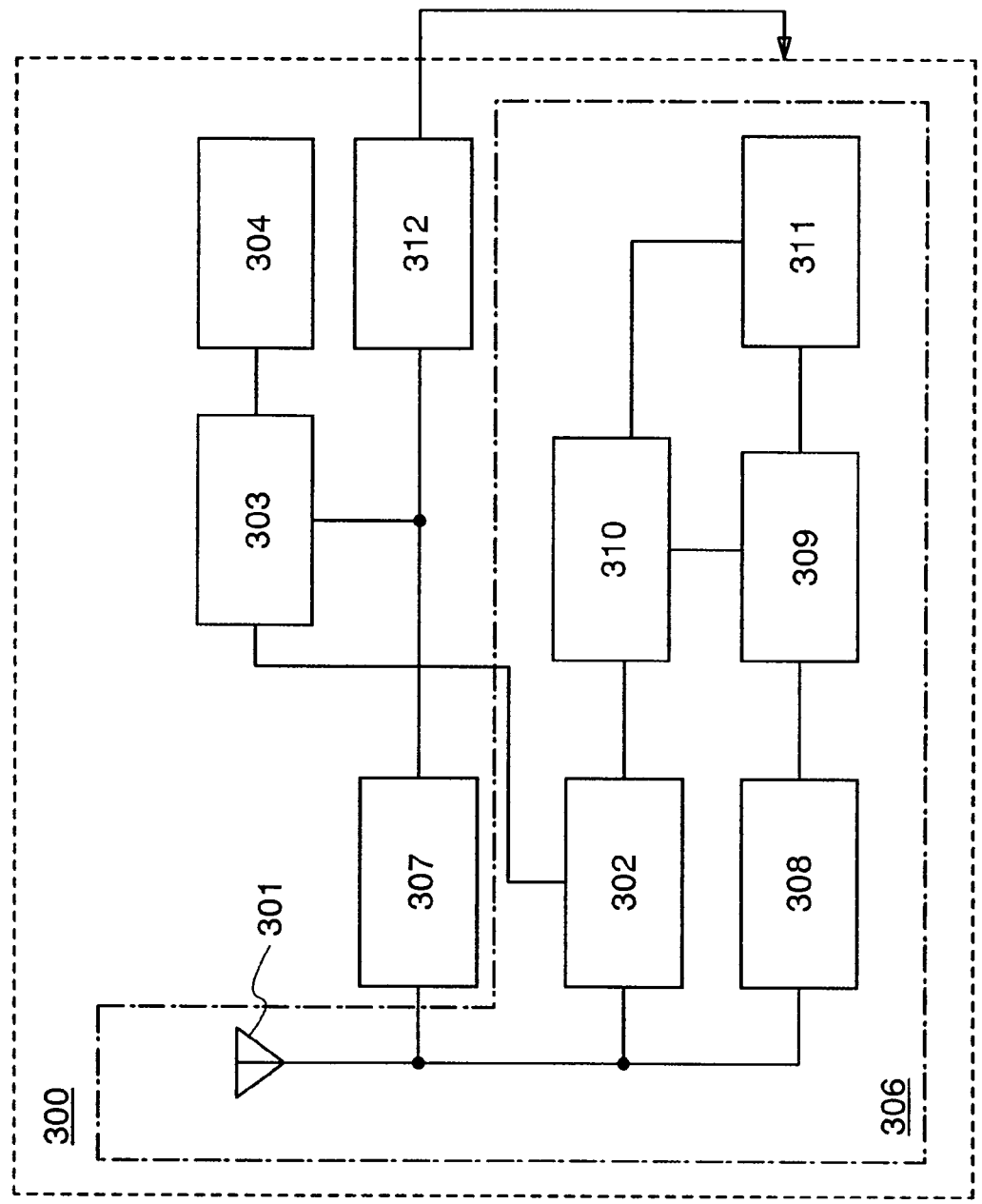
FIG. 6 is a block diagram illustrating a structure of a semiconductor device of the present invention.

FIG. 6 is a block diagram of the semiconductor device of this embodiment mode. The semiconductor device 300 in this embodiment mode includes the antenna 301, the demodulation circuit 302, the control circuit 303, a transmission medium 304, the rectifier circuit 307, a modulation circuit 308, an encoder 309, a signal generation circuit 310, a memory 311, and a regulator 312. The demodulation circuit 302, the control circuit 303, the rectifier circuit 307, the modulation circuit 308, the encoder 309, the signal generation circuit 310, the memory 311, and the regulator 312 correspond to an integrated circuit. Moreover, the load 306 includes the antenna 301, the demodulation circuit 302, the modulation circuit 308, the encoder 309, the signal generation circuit 310, and the memory 311.

Note that, in this embodiment mode, one demodulation circuit 302 combines the functions of the demodulation circuit of the ID tag corresponding to the load 306 and the demodulation circuit of the semiconductor device 300; however, the present invention is not limited to the structure. The demodulation circuit which the semiconductor device 300 should normally have may be provided separately, aside from the demodulation circuit which the load 306 has. Furthermore, in this embodiment mode, one antenna 301 combines the functions of the antenna of the ID tag corresponding to the load 306 and the antenna of the semiconductor device 300;

however, the present invention is not limited to the structure. The antenna of the semiconductor device 300 may be provided separately, aside from the antenna which the load 306 has.

DC voltage for power supply generated in the rectifier circuit 307 is provided to the control circuit 303. Moreover, the DC voltage level of power supply generated in the rectifier circuit 307 is kept constant with the regulator 312, and the DC voltage is supplied to the integrated circuit as a driving voltage.

In this embodiment mode, AC voltage input from the antenna 301 is demodulated in the demodulation circuit 302, and is also input into the signal generation circuit 310 of a next stage, separately from the control circuit 303. The signal generation circuit 310 generates a signal by arithmetic processing in accordance with the signal input from the demodulation circuit 302. In the foregoing arithmetic processing, the memory 311 can be used as a primary cache memory or a secondary cache memory. The signal generated in the signal generation circuit 310 is output to the modulation circuit 308 after encoded in the encoder 309. The modulation circuit 308 applies load modulation to the antenna 301 in accordance with the signal. The radio waves generated upon application of the load modulation to the antenna 301 are received by the reader, whereby the reader can receive the signal from the signal generation circuit 310.

In this embodiment mode, it is possible to determine the communication distance between the semiconductor device and the reader. Therefore, the location information of only a particular physical object can be promptly detected, even if there is a plural physical objects.

In addition, by placing readers on three or more different points of location to measure the distance between the readers and an ID tag, location information of an object in two-dimensional space can be obtained. Further, by placing readers on four or more different points of location to measure the distance between the readers and an ID tag, location information of an object in three-dimensional space can also be obtained.

Note that in FIG. 6 illustrates the case where location information of the semiconductor device is transmitted in accordance with a request from the reader; however, location information of the semiconductor device may constantly be transmitted without a request from the reader. In this case the demodulation circuit 302 is not necessary. Thus, the structure of the semiconductor device 300 can be simplified.

In addition, in this embodiment mode the structure of the semiconductor device without a battery is described; however, the present invention is not limited to this structure. The semiconductor device shown in this embodiment mode may additionally have a battery. Note that a charging circuit is provided in the case where the battery is a secondary battery or a capacitor.

Note that communication between the semiconductor device 300 and the reader can be carried out by using various frequencies of radio waves such as 125 kHz, 13.56 MHz, 950 MHz, and 2.45 GHz. There are various modulation methods such as an amplitude modulation, a frequency modulation, a phase modulation, and the like; however, the present invention is not particularly limited to these. Further, transmission methods of a signal with radio waves can be classified into various kinds such as an electromagnetic coupling method, an electromagnetic induction method, a micro-wave method, and the like, depending on the wavelength of a carrier. In the present invention, the foregoing transmission methods can be used.

Although the structure of the semiconductor device 300 which includes the antenna 301 is described in this embodiment mode, the semiconductor device of the present invention does not necessary have the antenna.

Embodiment Mode 7

In the present invention, a light-emitting element is used as a transmission medium. The amount of the electrical energy in the battery or location information of the semiconductor device can be transmitted by controlling the blinking interval of the light-emitting element. This embodiment mode will describe structures of a control circuit and a transmission medium mentioned in the above case.

Figure 7:
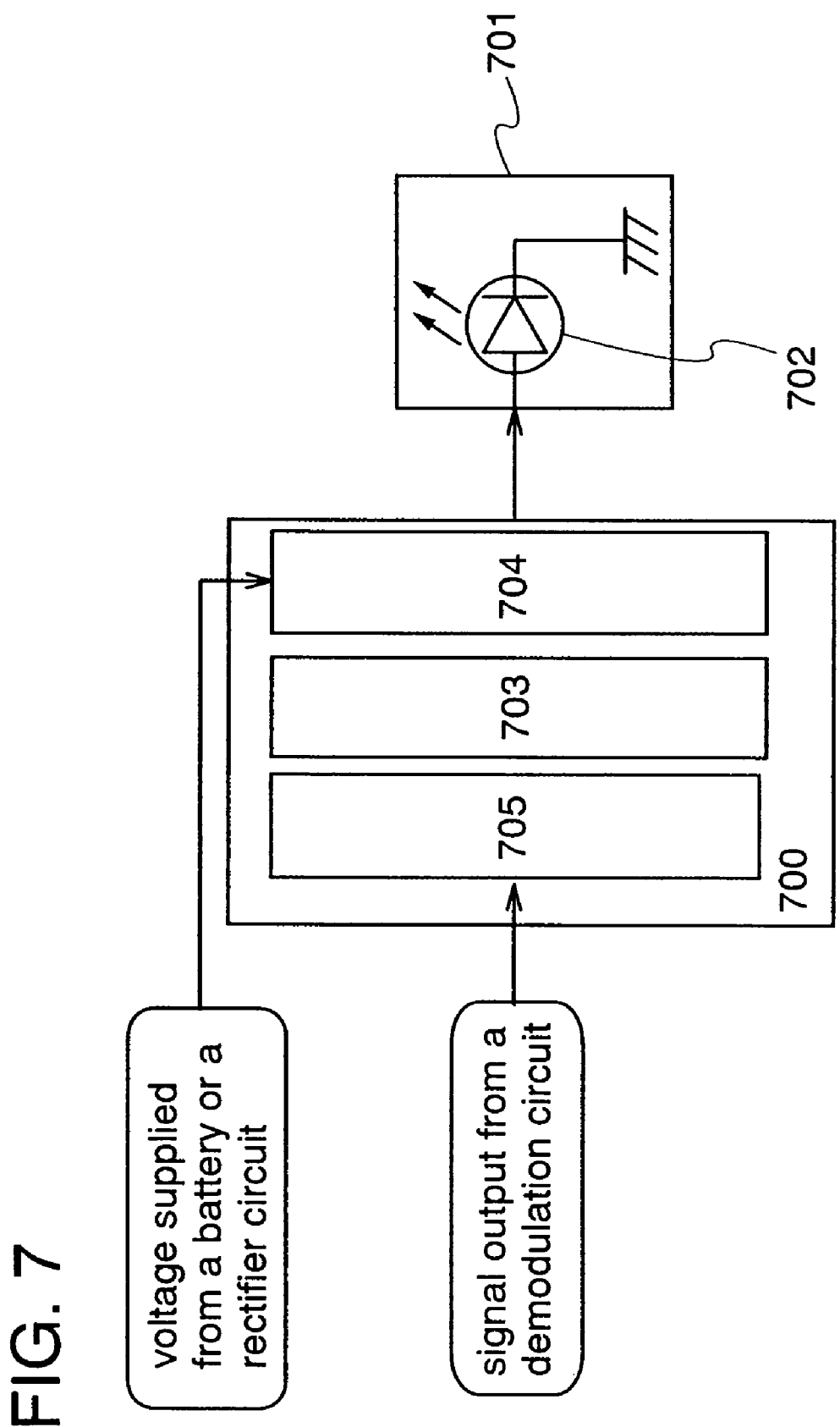
FIG. 7 is a block diagram illustrating structures of a control circuit and a transmission medium.

FIG. 7 is a block diagram illustrating structures of a control circuit 700 and a transmission medium 701 in this embodiment mode. FIG. 7 shows an example of employing a light-emitting diode 702 as the light-emitting element which the transmission medium 701 includes; however, this embodiment mode is not limited to the light-emitting diode 702. As the light-emitting element, an element whose luminance is controlled with current or voltage may be used. Specifically, in addition to the light-emitting diode, an OLED (Organic Light-emitting Diode), an MIM electron emitter (electron-emissive element) used for FED (Field Emission Display), and the like can be used.

The control circuit 700 includes a signal processing circuit 705, a switching circuit 703, and an oscillator circuit 704. The demodulation circuit transmits a signal which requests transmission of the residual amount of the electrical energy in the battery or location information of the semiconductor device, and the signal processing circuit 705 decodes and outputs the signal. The switching circuit 703 controls the oscillator circuit 704 to start driving in accordance with the signal output from the signal processing circuit 705. Voltage supplied by the battery or the rectifier circuit is provided to the oscillator circuit 704. More specifically, in the case of transmitting the residual amount of the electrical energy in the battery, voltage supplied by the battery is provided. In the case of transmitting the location information of the semiconductor device, voltage supplied by the rectifier circuit is provided.

The oscillator circuit 704 generates a signal having different frequencies depending on the level of voltage provided and outputs the signal into the transmission medium 701. In the transmission medium 701, the light-emitting diode 702 blinks in accordance with the input signal. Since the blinking frequencies depend on frequencies of the signal output from the oscillator circuit 704, the level of voltage provided to the oscillator circuit 704 can be determined by referring to the blinking frequencies. Therefore, the residual amount of the electrical energy in the battery, or the distance between the reader and the semiconductor device can be determined indirectly based on the blinking frequencies of the light-emitting diode 702.

Note that in FIG. 7, the signal output from the oscillator circuit 704 is directly input into the transmission medium 701; however, this embodiment is not limited to this structure. The signal output from the oscillator circuit 704 may be input to the transmission medium 701 after applied denoising or waveform shaping with a buffer or the like. Additionally, the amplitude of the signal output from the oscillator circuit 704 may be controlled with a level shifter or the like, and thereafter the signal may be input into the transmission medium 701.

Moreover, this embodiment mode illustrates a structure in which the oscillator circuit 704 operates only when a signal, which requests transmission of the residual amount of the electrical energy in the battery or location information of the semiconductor device, is input from the demodulation circuit; however, the present invention is not limited to this. When the residual amount of the electrical energy in the battery or location information of the semiconductor device is constantly transmitted, the signal processing circuit 705 and the switching circuit 703 are not necessarily required. In that case, it is acceptable as long as the oscillator circuit 704 operates constantly.

Furthermore, in the case that the oscillator circuit 704 has a function of a switching circuit, the switching circuit 703 does not need to be provided in the control circuit.

Additionally, in this embodiment mode, an example of using the light-emitting element as the transmission medium 701 is described; however, the present invention is not limited to this. A liquid crystal cell, an electronic ink, or a DMD may be used instead of the light-emitting element. When gray scales of the display elements are changed periodically in accordance with the signal from the oscillator circuit 704, it is possible to determine indirectly the residual amount of the electrical energy in the battery or the communication distance between the reader and the semiconductor device from the periodic change.

In addition, in this embodiment mode, a structure in which a transmission medium has one light-emitting diode 702 is described; however, the present invention is not limited to this. The residual amount of the electrical energy in the battery or the communication distance between the reader and the semiconductor device may be transmitted by providing a plurality of light-emitting diodes 702 and blinking the plurality of light-emitting diodes 702.

Embodiment Mode 8

In the present invention, the residual amount of the electrical energy in the battery or the location information of the semiconductor device can be transmitted by displaying gray scales in accordance with the level of voltage or the amount of current of a signal provided to the transmission medium. This embodiment mode will describe structures of a control circuit and a transmission medium in the above-mentioned case.

Figure 8:
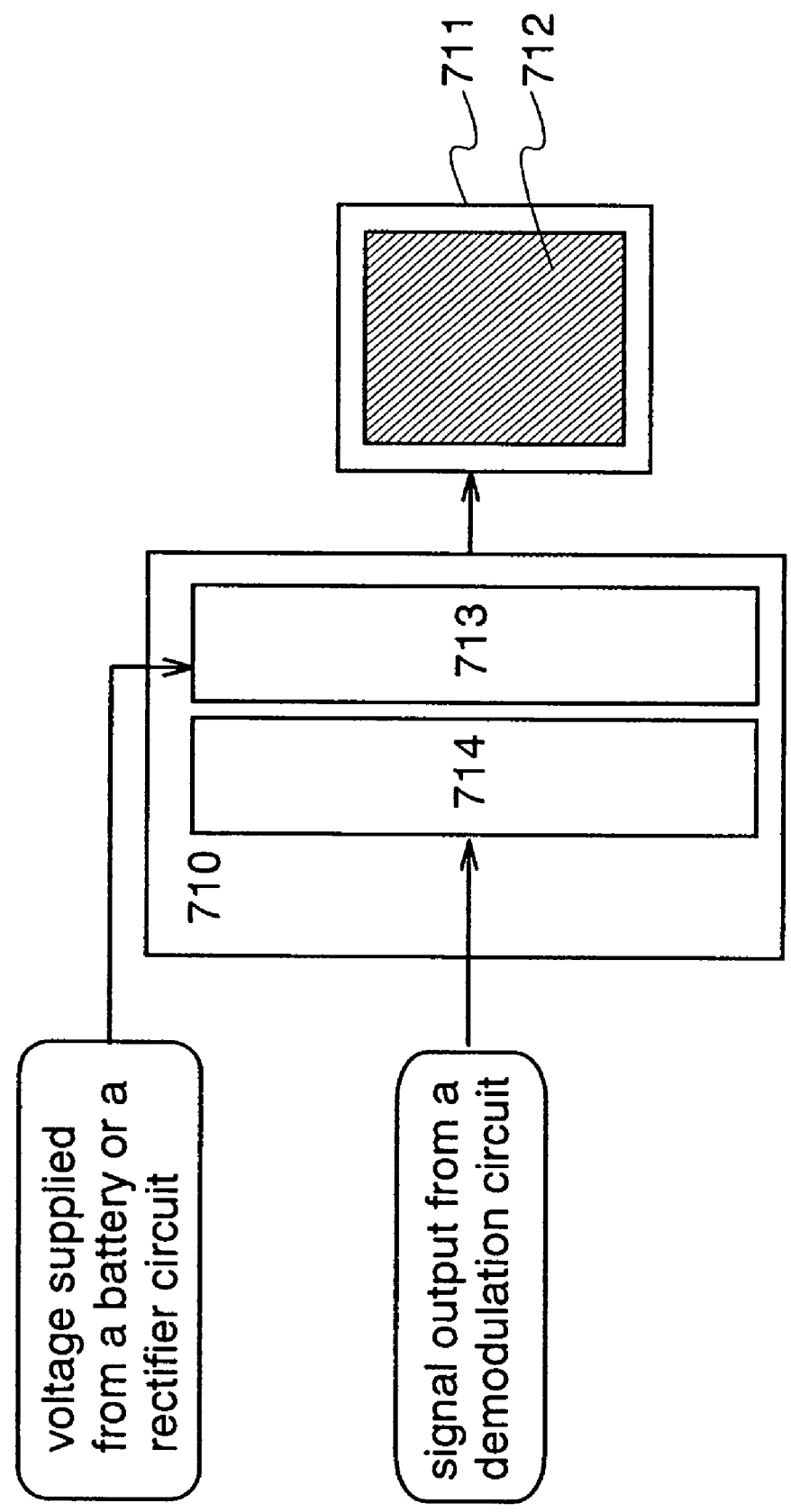
FIG. 8 is a block diagram illustrating structures of a control circuit and a transmission medium.

FIG. 8 is a block diagram illustrating structures of a control circuit 710 and a transmission medium 711 in this embodiment mode. FIG. 8 shows an example of employing a liquid crystal cell for a pixel 712 which the transmission medium 711 includes; however, this embodiment mode is not limited to the structure. In this embodiment mode, a display element which can display gray scales with current or voltage, for instance, a light-emitting element, an electronic ink, a DMD, and the like may be used.

The control circuit 710 includes a signal processing circuit 714 and a sample-and-hold circuit 713. The demodulation circuit transmits a signal requesting transmission of the residual amount of the electrical energy in the battery or the location information of the semiconductor device, and the signal processing circuit 714 decodes and outputs the signal. The sample-and-hold circuit 713 starts to drive in accordance with the signal output from the signal processing circuit 714. The sample-and-hold circuit 713 samples voltage supplied from the battery or the rectifier circuit and outputs the voltage into the transmission medium 711 as a signal.

In the transmission medium 711, based on the signal input from the sample-and-hold circuit 713, gray scales are displayed in the pixel 712. Thus, the residual amount of the electrical energy in the battery or the communication distance between the reader and the semiconductor device can be determined in a relative manner based on the gray scales displayed in the pixel 712. Note that gray scales can be displayed with a digital gray scale method typified by a time ratio gray scale method by providing an analog-to-digital (AD) conversion circuit on the next stage of the sample-and-hold circuit 713 and using output a digital signal.

In this embodiment mode, liquid crystal cells are used as the pixel 712. A liquid crystal cell includes a pixel electrode, a common electrode, and a liquid crystal which is interposed between the electrodes. Constant potential is provided to the common electrode which the pixel 712 has regardless of the signal potential input from the sample-and-hold circuit 713. Then, by controlling the potential of the pixel electrode which the pixel 712 has with the potential of the signal input from the sample-and-hold circuit 713, gray scales of the pixel 712 can be changed. Note that the liquid crystal cell may be any of a transmissive liquid crystal cell, a reflective liquid crystal cell, and a semi-transmissive liquid crystal cell. In the case where a transmissive liquid crystal cell or a semi-transmissive liquid crystal cell is employed, the transmission medium 711 has a backlight.

Note that in FIG. 8, the signal output from the sample-and-hold circuit 713 is directly input into the transmission medium 711; however, this embodiment is not limited to this structure. The signal output from the sample-and-hold circuit 713 may be input to the transmission medium 711 after applied denoising or waveform shaping with a buffer or the like.

Moreover, this embodiment mode illustrates a structure in which the sample-and-hold circuit 713 operates only when a signal, which requests transmission of the residual amount of the electrical energy in the battery or location information of the semiconductor device, is input from the demodulation circuit; however, the present invention is not limited to this. The residual amount of the electrical energy in the battery or the location information of the semiconductor device may constantly be transmitted. In this case, the signal processing circuit 714 is not necessary provided.

Additionally, in this embodiment mode, a structure in which the transmission medium has one pixel 712 is described; however, the present invention is not limited to the structure. A plurality of pixels may be provided so that gray scales may be displayed with the plurality of the pixels.

Embodiment Mode 9

In the present invention, the residual amount of the electrical energy in the battery or the location information of the semiconductor device can be transmitted by using a display device having a plurality of pixels and displaying binary gray scales on each of the plurality of pixels in accordance with the level of input voltage. This embodiment mode will describe structures of the control circuit and the transmission medium in the foregoing case.

Figure 9:
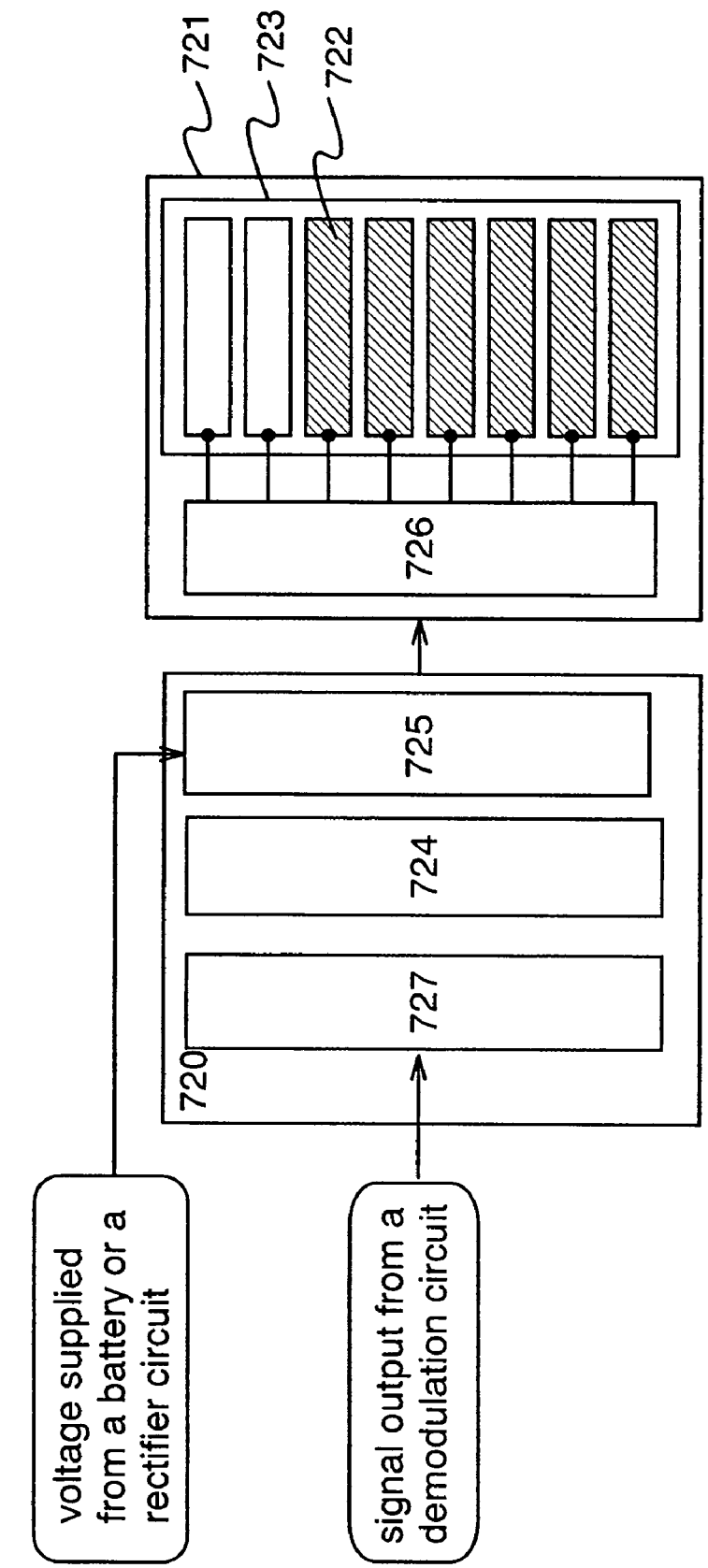
FIG. 9 is a block diagram illustrating structures of a control circuit and a transmission medium.

FIG. 9 is a block diagram illustrating a structure of a control circuit 720 and a transmission medium 721 in this embodiment mode. The transmission medium 721 includes a pixel portion 723 which has a plurality of pixels 722 and a driver circuit 726 for controlling the operation of the pixels 722. FIG. 9 illustrates an example of using liquid crystal cells as the pixels 722 which the transmission medium 721 has; however, this embodiment mode is not limited to this structure. In this embodiment mode, a display element which can display binary gray scales with current or voltage, for instance, a light-emitting element, an electronic ink, a DMD, and the like may be used.

The control circuit 720 has a signal processing circuit 727, a switching circuit 724, and an analog-to-digital (AD) conversion circuit 725. The demodulation circuit transmits a signal which requests transmission of the residual amount of the electrical energy in the battery and location information of the semiconductor device, and then the signal processing circuit 727 decodes and outputs the signal. The switching circuit 724 controls the AD conversion circuit 725 to start driving in accordance with the signal output from the signal processing circuit 727. Voltage supplied by the battery or the rectifier circuit is provided to the AD conversion circuit 725. Specifically, in the case transmitting the residual amount of the electrical energy in the battery, voltage is provided from the battery. In the case transmitting the location information of the semiconductor device, voltage from the rectifier circuit is provided.

The AD conversion circuit 725 generates a digital signal having information about the level of the voltage provided and outputs the signal to the driver circuit 726 in the transmission medium 721. The driver circuit 726 selects suitable number of pixels 722 corresponds to the voltage provided to the control circuit 720 among the pixels 722 in accordance with the digital signal, and the gray scales of the pixels 722 are changed. Therefore, the residual amount of the electrical energy in the battery or the communication distance between the reader and the semiconductor device can be determined indirectly based on the number of the pixels 722 whose gray scales have changed.

In this embodiment mode, liquid crystal cells are used for the pixels 722. A liquid crystal cell includes a pixel electrode, a common electrode, and a liquid crystal which is interposed between the electrodes. Common potential is provided to the common electrodes of all the pixels 722. Then, by controlling the potential of the pixel electrode of each pixel 722 with the control circuit 720, gray scales of only the selected pixels 722 can be changed. Note that the liquid crystal cells may be transmissive liquid crystal cells, reflective liquid crystal cells, and semi-transmissive liquid crystal cells. In the case where transmissive liquid crystal cells or semi-transmissive liquid crystal cells are employed, the transmission medium 721 has a backlight.

Note that in FIG. 9, the signal output from the AD conversion circuit 725 is directly input into the transmission medium 721; however, this embodiment is not limited to this structure. The signal output from the AD conversion circuit 725 may be input to the transmission medium 721 after applied denoising or waveform shaping with a buffer or the like. Additionally, the amplitude of the signal output from the AD conversion circuit 725 may be controlled with a level shifter or the like, and thereafter the signal may be input into the transmission medium 721.

Moreover, this embodiment mode illustrates a structure in which the AD conversion circuit 725 operates only when a signal which requests transmission of the residual amount of the electrical energy in the battery or location information of the semiconductor device, is input from the demodulation circuit; however, the present invention is not limited to this. When the residual amount of the electrical energy in the battery or location information of the semiconductor device is constantly transmitted, the signal processing circuit 727 and the switching circuit 724 are not necessarily required. In that case, it is acceptable as long as The AD conversion circuit 725 operates constantly.

Furthermore, in the case that the AD conversion circuit 725 has a function as a switching circuit, the extra switching circuit 724 is not necessary to be provided in the control circuit.

Embodiment Mode 10

In the present invention, the residual amount of the electrical energy in the battery or the location information of the semiconductor device can be transmitted by using display device having a plurality of pixels and displaying predetermined images on the plurality of pixels in accordance with the level of input voltage. This embodiment mode will describe a structure of the control circuit and the transmission medium in the foregoing case.

Figure 10:
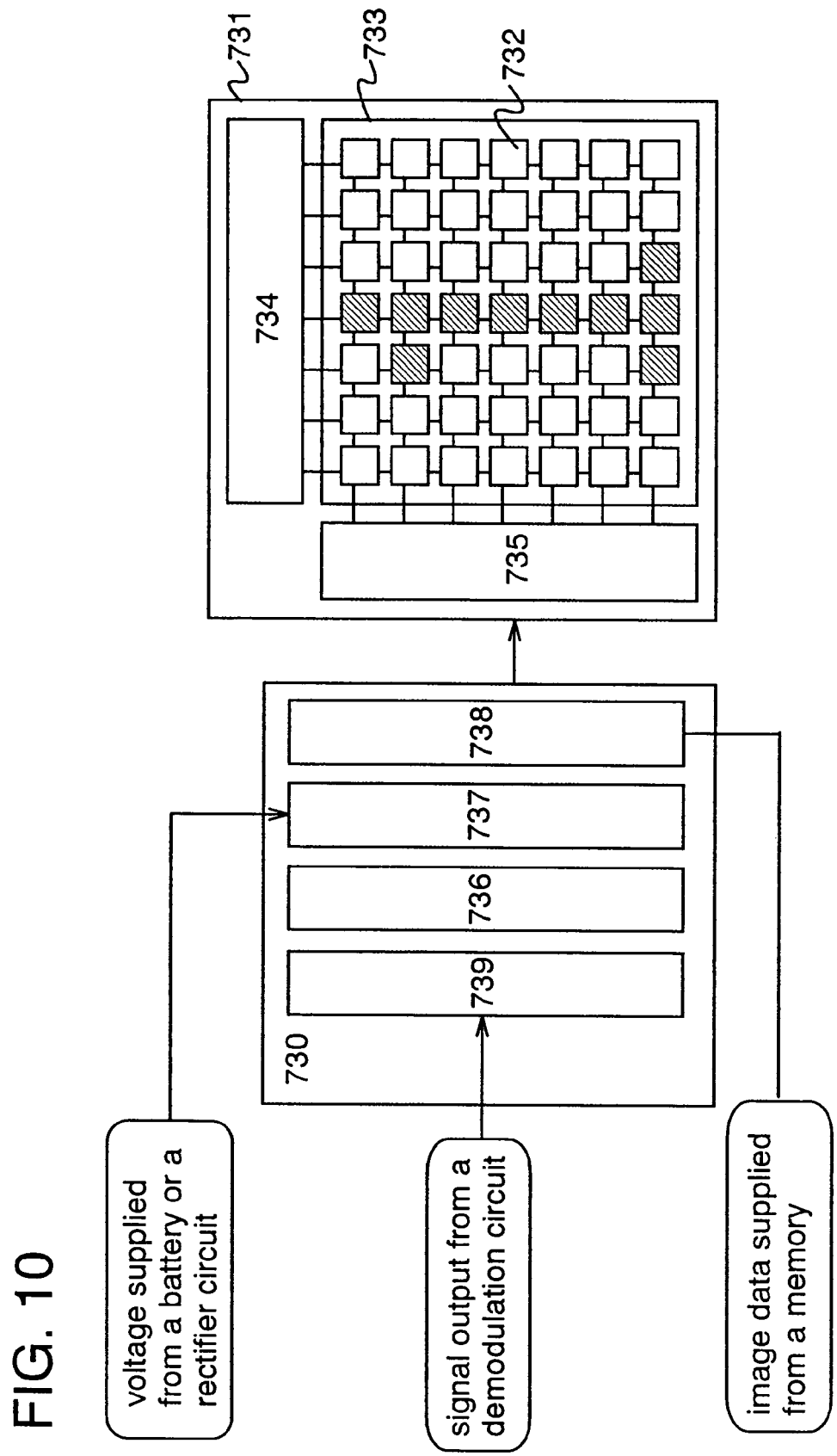
FIG. 10 is a block diagram illustrating structures of a control circuit and a transmission medium.

FIG. 10 is a block diagram illustrating structures of a control circuit 730 and a transmission medium 731 in this embodiment mode. The transmission medium 731 includes a pixel portion 733 which has a plurality of pixels 732, and a signal line driver circuit 734 and a scan line driver circuit 735 for controlling the operation of the pixels 732. FIG. 10 illustrates an example of using light-emitting elements in the pixels 732 which the transmission medium 731 has; however, this embodiment mode is not limited to this structure. In this embodiment mode, a display element which can display gray scales with current or voltage, for instance, liquid crystal cells, electronic inks, DMDs, or the like may be used in addition to light-emitting elements.

The control circuit 730 has a signal processing circuit 739, a switching circuit 736, an AD conversion circuit 737, and a controller 738. The demodulation circuit transmits the signal which requests transmission of the residual amount of the electrical energy in the battery or location information of the semiconductor device, and then the signal processing circuit 739 decodes and outputs the signal. The switching circuit 736 controls the AD conversion circuit 737 to start driving in accordance with the signal output from the signal processing circuit 739. Voltage supplied by the battery or the rectifier circuit is provided to the AD conversion circuit 737. Specifically, in the case of transmitting the residual amount of the electrical energy in the battery, voltage is provided from the battery. In the case transmitting the location information of the semiconductor device, voltage from the rectifier circuit is provided.

The AD conversion circuit 737 generates a digital signal having information about the level of the voltage provided and outputs the digital signal to the controller 738. The controller 738 retrieves image data corresponding to the digital signal from a memory based on the input the digital signal. The controller 738 has the image data as information, generates video signals which meet the standards of the signal line driver circuit 734 and the scan line driver circuit 735, and outputs the video signals to the transmission medium 731. Additionally, the controller 738 generates a control signal to control driving of the signal line driver circuit 734 and the scan line driver circuit 735, and outputs the signals to the transmission medium 731. Note that this embodiment mode shows an example that the memory storing image data is provided outside of the control circuit 730; however, the present invention is not limited to the structure. The memory may be provided inside of the control circuit 730.

On the other hand, the pixels 732 are arranged in matrix in the pixel portion 733. The scan line driver circuit 735 selects pixels the 732 by row by row in accordance with the control signal input form the controller 738. The signal line driver circuit 734 samples video signals in accordance with the control signal input form the controller 738 and inputs the video signals sequentially into the pixels 732 selected by the scan line driver circuit 735. The gray scales of the pixels 732 change in accordance with the input the video signals; thus, images are displayed on the pixel portion 733 by changing the gray scales of all the pixels 732. The residual amount of the electrical energy in the battery and the communication distance between the reader and the semiconductor device can be determined based on the displayed images.

Note that the gray scales in the pixels 732 may be displayed by a digital gray scale method, which uses digital video signals, typified by a time ratio gray scale method, an area ratio gray scale method, or the like. Alternatively, an analog gray scale method, which controls the luminance of the light-emitting element by using analog video signals, may be used.

In this embodiment mode, the light-emitting element is used in the pixels 732. The light-emitting element includes a pixel electrode, a common electrode, and an electroluminescent layer which is interposed between the electrodes. Common potential is provided to the common electrodes of all the pixels 732. Then, by controlling the potential of pixel electrodes of each the pixel 732 with a video signal, gray scales of only the selected pixels 732 can be changed.

Note that in FIG. 10, the signal output from the AD conversion circuit 737 is directly input into the transmission medium 731; however, this embodiment is not limited to this structure. The signal output from the AD conversion circuit 737 may be input to the transmission medium 731 after applied denoising or waveform shaping with a buffer or the like. Additionally, the amplitude of the signals output from the AD conversion circuit 737 may be controlled with a level shifter or the like, and thereafter the signal may be input into the transmission medium 731.

Moreover this embodiment mode illustrates a structure in which the AD conversion circuit 737 operates only when a signal, which requests transmission of the residual amount of the electrical energy in the battery or location information of the semiconductor device, is input from the demodulation circuit; however, the present invention is not limited to this. When the residual amount of the electrical energy in the battery or location information of the semiconductor device is constantly transmitted, the signal processing circuit 739 and the switching circuit 736 are not necessarily required. In that case, it is acceptable as long as the AD conversion circuit 737 operates constantly.

Furthermore, in the case that the AD conversion circuit 737 has a function of a switching circuit, the switching circuit 736 does not need to be provided in the control circuit.

Embodiment Mode 11

In the present invention, the residual amount of the battery of the electrical energy or the location information of the semiconductor device can be transmitted by using a speaker as a transmission medium and controlling intervals of sound which the speaker emits. This embodiment mode will describe structures of the control circuit and the transmission medium in the foregoing case.

Figure 11:
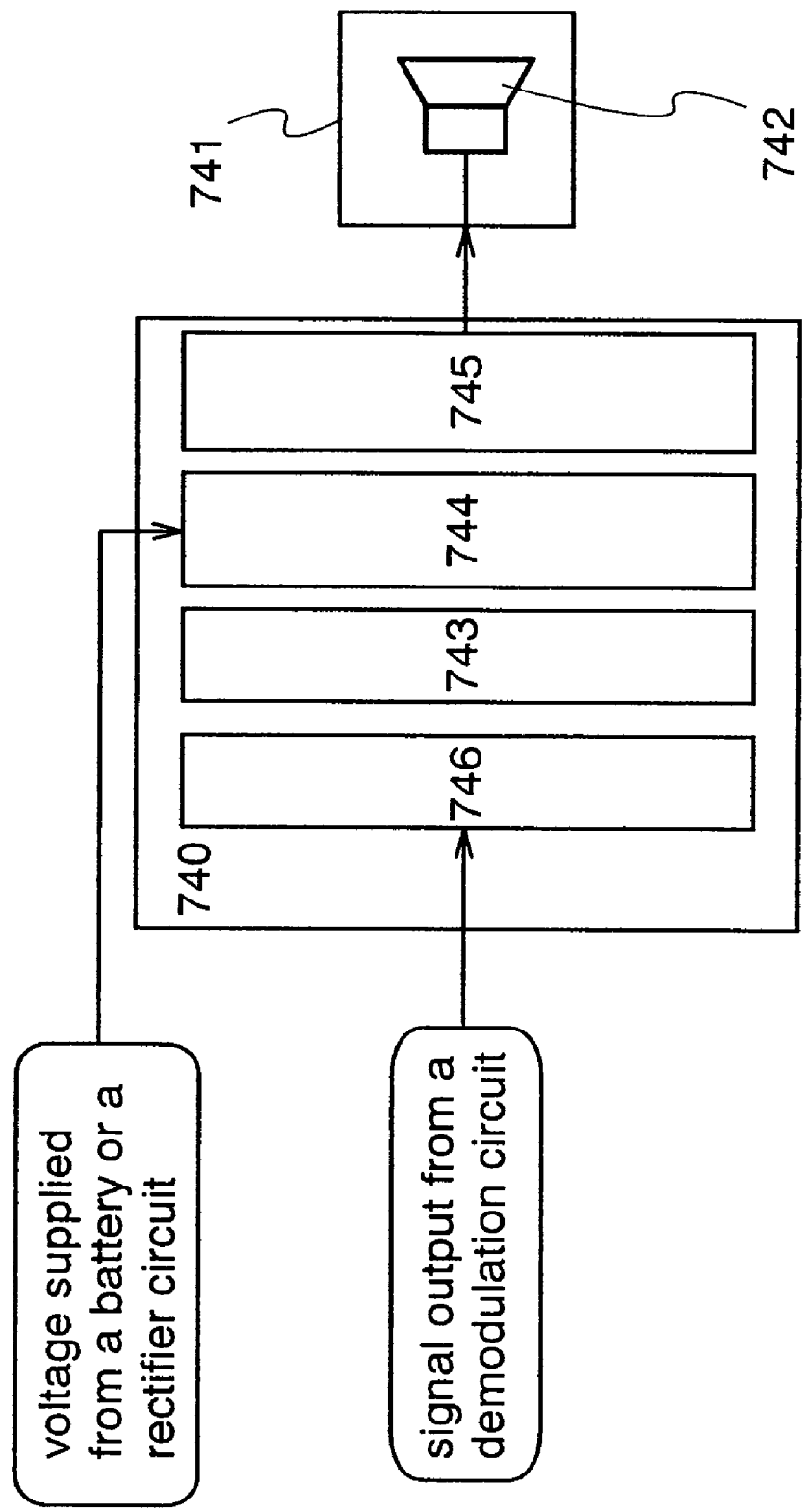
FIG. 11 is a block diagram illustrating structures of a control circuit and a transmission medium.

FIG. 11 is a block diagram illustrating structures of a control circuit 740 and a transmission medium 741 in this embodiment mode. The transmission medium 741 includes a speaker 742. The speaker 742 is an element which can convert an electric signal into acoustic waves, and includes a vibrator which vibrates in accordance with an electric signal and an emitting portion which effectively emits the vibration of the vibrator as acoustic waves. The control circuit 740 has a signal processing circuit 746, a switching circuit 743, an oscillator circuit 744, and an audio processing circuit 745. The demodulation circuit transmits a signal which requests transmission of the residual amount of the electrical energy in the battery and location information of the semiconductor device, and then the signal processing circuit 746 decodes and outputs the signal. The switching circuit 743 controls the oscillator circuit 744 to start driving in accordance with the signal output from the signal processing circuit 746. Voltage supplied by the battery or the rectifier circuit is provided to the oscillator circuit 744. Specifically, in the case of transmitting the residual amount of the electrical energy in the battery, voltage is provided from the battery. In the case of transmitting the location information of the semiconductor device, voltage from the rectifier circuit is provided.

The oscillator circuit 744 generates signals having different frequencies depending on the level of voltage provided and outputs a signal into the audio processing circuit 745. The audio processing circuit 745 applies denoising or waveform shaping to the input signals, or processes the signals to meet specification of the speaker 742 and outputs the signal to the transmission medium 741. In the transmission medium 741, the speaker 742 emits pulsed sound in accordance with the input signal. The pulse frequencies depend on the frequencies of the signal output from the oscillator circuit 744; thus, the level of voltage provided to the oscillator circuit 744 can be determined based on the pulse frequencies. Therefore, the residual amount of the electrical energy in the battery or the distance between the reader and the semiconductor device can be determined indirectly based on the pulse frequencies of the sound from the speaker 742.

Note that in FIG. 11, the audio processing circuit 745 applies some sort of process to the signals output from the oscillator circuit 744; however, the present invention is not limited to this structure. Signals output from the oscillator circuit 744 may directly be input into the transmission medium 741 without providing the audio processing circuit 745.

Moreover this embodiment mode illustrates a structure in which the oscillator circuit 744 operates only when a signal, which requests transmission of the residual amount of the electrical energy in the battery or location information of the semiconductor device, is input from the demodulation circuit; however, the present invention is not limited to this. When the residual amount of the electrical energy in the battery or location information of the semiconductor device is constantly transmitted, the signal processing circuit 746 and the switching circuit 743 are not necessarily required. In that case, it is acceptable as long as the oscillator circuit 744 operates constantly.

Furthermore, in the case that the oscillator circuit 744 has a function of a switching circuit, the switching circuit 743 does not need to be provided in the control circuit.

Additionally, in this embodiment mode, the residual amount of the electrical energy in the battery, or the distance between the reader and the semiconductor device can be determined based on pulse frequencies of the sound from the speaker 742; however, the present invention is not limited to the structure. By changing the volume of sound from the speaker 742 in accordance with voltage supplied from the battery or the rectifier circuit, the residual amount of the electrical energy in the battery or the communication distance between the reader and the semiconductor device can be determined based on the sound volume. In this case, an amplifier for amplifying the signals may be provided between the oscillator circuit 744 and the audio processing circuit 745 in the control circuit 740.

Additionally, in this embodiment mode, a structure in which the transmission medium has one speaker 742 is described; however, the present invention is not limited to the structure. The residual amount of the electrical energy in the battery or the communication distance between the reader and the semiconductor device may be transmitted by providing and utilizing a plurality of the speakers 742.

Embodiment 1

This embodiment will describe a structure of active matrix display device used as a transmission medium.

Figure 12:
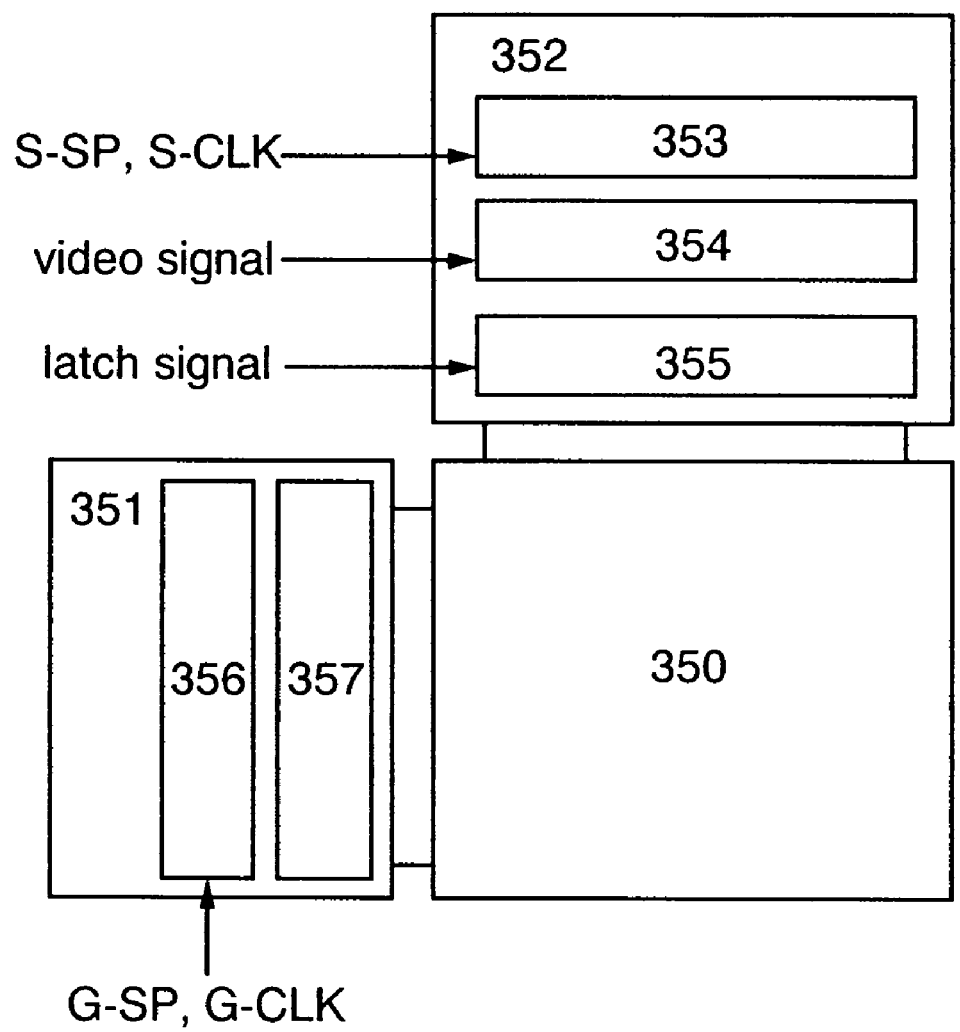
FIG. 12 is a block diagram illustrating a structure of a transmission medium.

FIG. 12 illustrates a block diagram of a transmission medium in this embodiment. The transmission medium shown in FIG. 12 has a pixel portion 350 which includes a plurality of pixels in which display element such as light-emitting elements or liquid crystal cells, are formed a scan line driver circuit 351 for selecting pixels, and a signal line driver circuit 352 for controlling the input of video signals into the selected pixels.

In FIG. 12, the signal line driver circuit 352 has a shift register 353, a first latch 354, and a second latch 355. The shift register 353 generates timing signals in accordance with clock signals (S-CLK) for signal lines and start pulse signals (S-SP) for signal lines input into the shift register 353. The generated timing signals are input into the first latch 354 of the first stage sequentially. When the timing signals are input to the first latch 354, video signals are sequentially written to the first latch 354 in accordance with the pulse of the timing signals and retained therein. Note that in this embodiment, although the video signals are written to the first latch 354 in sequence, the present invention is not limited to this structure. A so called division drive may be employed in which a plurality of stages of the first latch 354 are divided into several groups, and video signals are input in parallel to each group. Note that the number of the groups at this time is called a division number. For example, when the latches are divided into four groups, this is called a division drive with four divisions.

When writing video signals to all stages of the first latch 354 has terminated, video signals retained in the first latch 354 are written into the second latch 355 at the same time in accordance with the latch signals and retained in the second latch 355. Once the first latch 354 has terminated transmitting video signals to the second latch 355, video signals in the next line period are written to the first latch 354 in sequence in accordance with timing signals from the shift register 353 again. The video signals, which are written to and retained in the second latch 355 in parallel at the same time as the writing to the first latch 354 in the second line period, are input into the pixel portion 350.

Note that a circuit with another configuration that can select signal lines may be used instead of the shift register 353.

Next, a structure of the scan line driver circuit 351 is described. The scan line driver circuit 351 includes a shift register 356 for generating selection signals and a buffer 357. Note that the buffer 357 is not necessary provided; however, in order to turn on all transistors of a single pixel row at the same time, providing the buffer 357 to which a large current can be fed is very effective. Additionally, a level shifter may be provided in addition to the buffer.

In the scan line driver circuit 351, the shift register 356 generates selection signals in accordance with clock signals (G-CLK) for the scan line driver circuit and start pulse signals (G-SP) for the scan line driver circuit. The generated selection signals are applied denoising or waveform shaping with the buffer 357 and are input into the corresponding scan line. Gates of transistors of a single pixel row are connected to the scan line.

Note that a circuit with another configuration, which can select the scan lines, may be used as a circuit for generating selection signals instead of the shift register 356.

The display device shown in this embodiment can employ a time gray scale method by which gray scales are displayed by controlling the light-emitting period of pixels using binary voltage of digital video signals. Specifically, in the case of displaying with a time gray scale method, one frame period is divided into a plurality of subframe periods. Then, in accordance with video signals, the light-emission state or non-light-emission state of pixels in each subframe is determined. With the above structure, the total length of time, in which pixels actually emit light in one frame period, is controlled to display gray scales with video signals.

In the present invention, various types of active matrix display devices, such as a liquid crystal display device, a light-emitting device, a display device with a DMD (digital micromirror device), a display device with electronic ink, can be used. As typical examples of the active matrix display device employed in the present invention include a liquid crystal display device, a DMD (digital micromirror device), a PDP (plasma display panel), an FED (field emission display), a display device with electronic ink, and the like, as well as a light-emitting device with a light-emitting element in each pixel typified by an organic light-emitting element (OLED).

This embodiment can be implemented in combination with the structure described in any of the above embodiment modes.

Embodiment 2

This embodiment will describe a structure of a pixel portion of an active matrix of liquid crystal display device as an exemplary transmission medium of the present invention.

Figure 13:
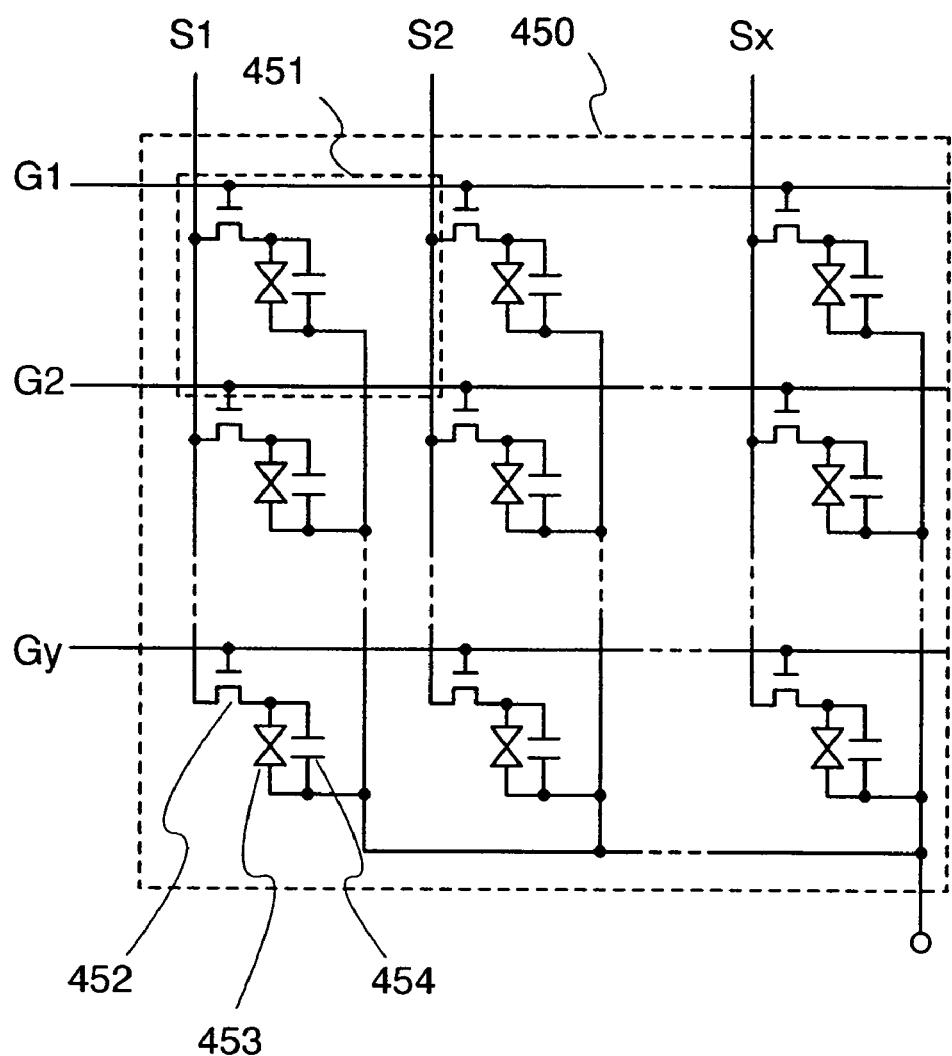
FIG. 13 is a circuit diagram illustrating a structure of a transmission medium.

FIG. 13 illustrates a structure of the pixel portion of this embodiment. In the pixel portion 450, signal lines S1 to Sx to which video signals from the signal line driver circuit are input cross scan lines G1 to Gy to which selection signals from a scan line driver circuit are input. The pixel portion 450 has a plurality of pixels 451. Each pixel 451 has a transistor 452 serving as a switching element, a liquid crystal cell 453 interposed between a common electrode and a pixel electrode, and a capacitor 454 for holding voltage between the common electrode and the pixel electrode.

The switching of the transistor 452 is controlled row by row by selection signals input to the scan lines G1 to Gy. Then, the voltage of video signals input to the signal lines S1 to Sx is provided to the pixel electrode of the liquid crystal cell 453 via the transistor 452 which is turned on.

Note that this embodiment describes a structure of an active matrix liquid crystal display device; however, the display device of the present invention can be a passive matrix liquid crystal display device in which pixels do not have a switching element.

In addition, this embodiment can be implemented in combination with any of embodiment modes and Embodiment 1.

Embodiment 3

This embodiment will describe a structure of an active matrix light-emitting device as an exemplary transmission medium of the present invention.

An active matrix light-emitting device has a light-emitting element in each pixel. Since the light-emitting element emits light by itself, it has high visibility. Further, since the light-emitting element does not need a backlight which a liquid crystal display requires, it is suitable for a thinner device, and it has no limitation of viewing angle. Typical examples of a light-emitting element include a element whose the luminance is controlled with current or voltage, specifically, an organic light-emitting diode (OLED), a light-emitting diode, a MIM electron emitter (electron-emissive element) used for a field emission display (FED), and the like.

An OLED which is one of the light-emitting elements has an anode, a cathode, and a layer (hereinafter, referred to as an electroluminescent layer) containing an electroluminescent material that can obtain luminescence (Electroluminescence) generated upon application of an electric field. The electroluminescent layer is provided between the anode and the cathode and formed in a single layer or a plurality of layers. In some cases, an inorganic compound is included in these layers. The luminescence of the electroluminescent layer includes luminescence (fluorescence) generated upon returning to a ground state from a singlet-excited state and luminescence (phosphorescence) generated upon returning to a ground state from a triplet-excited state. This embodiment describes the case of using OLED as a light-emitting element; however, in the present invention other light-emitting elements may be used as well.

Figure 14A:
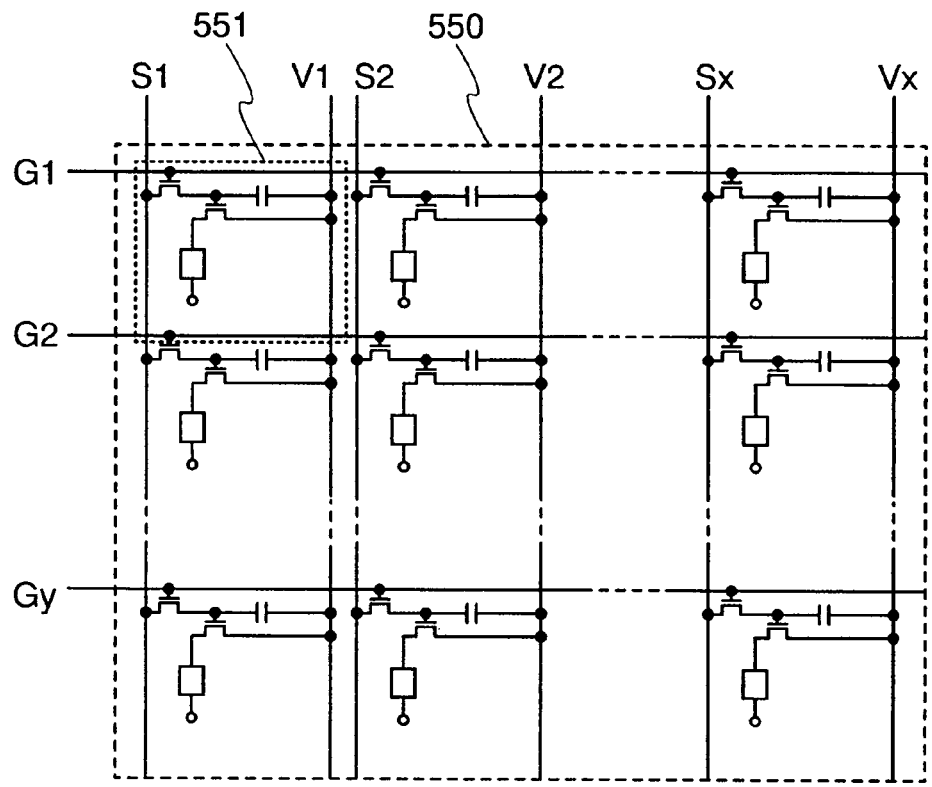
FIGS. 14A and 14B are circuit diagrams each illustrating a structure of a transmission medium.

FIG. 14A illustrates a structure of the pixel portion of the light-emitting device in this embodiment. In FIG. 14A, signal lines S1 to Sx, power supply lines V1 to Vx, and scan lines G1 to Gy are provided within a pixel portion 550. In this embodiment, a region which has each one of the signal lines S1 to Sx, the power supply lines V1 to Vx, and the scan lines G1 to Gy corresponds to a pixel 551. A plurality of pixels 551 is arranged in matrix within the pixel portion 550.

Figure 14B:
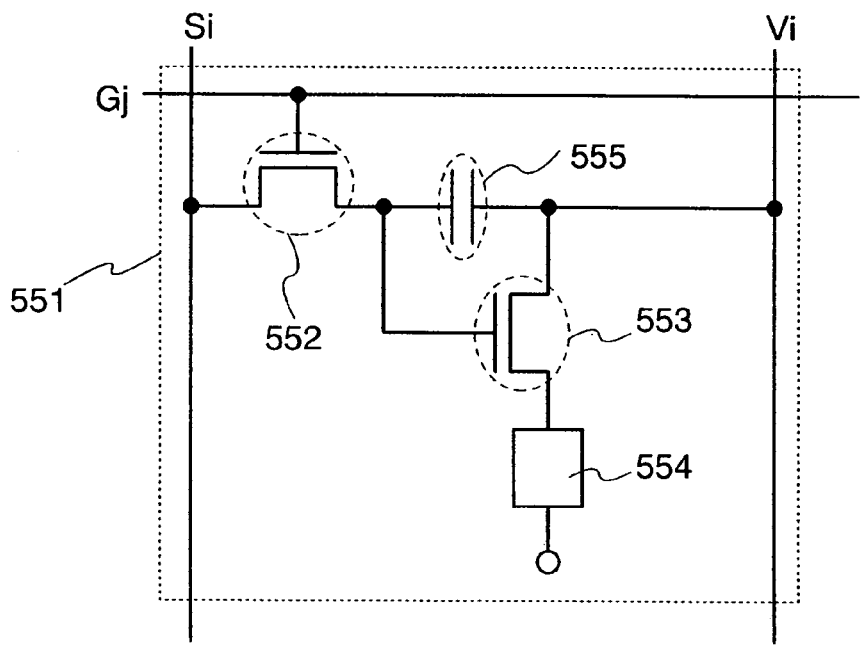

FIG. 14B is a magnified view of the pixel 551. In FIG. 14B, the reference numeral 552 denotes a switching transistor. A gate electrode of the switching transistor 552 is connected to a scan line Gj (j=1 to y). One of a source region and a drain region of the switching transistor 552 is connected to a signal line Si (i=1 to x) while the other is connected to a gate electrode of the driving transistor 553 and a capacitor 555 in each pixel 551.

The capacitor 555 is provided so as to hold a gate voltage (potential difference between the gate electrode and the source region) of the driving transistor 553 when the switching transistor 552 is in a non-selected state (off state). Note that this embodiment describes a structure provided with the capacitor 555; however, the present invention is not limited to this, and the capacitor 555 may be omitted.

Additionally, one of a source region and a drain region of the driving transistor 553 is connected to a power supply line Vi (i=1 to x) while the other is connected to a light-emitting element 554. The power supply line Vi is also connected to the capacitor 555.

The light-emitting element 554 includes an anode, a cathode, and an electroluminescent layer interposed therebetween. When the anode is connected to the source region or the drain region of the driving transistor 553, the anode is a pixel electrode while the cathode is a common electrode. On the other hand, when the cathode is connected to the source region or the drain region of the driving transistor 553, the cathode is a pixel electrode while the anode is a common electrode.

Predetermined voltage is provided to the common electrode of the light-emitting element 554 and the power supply line Vi.

The switching transistor 552 and the driving transistor 553 may be either an n-channel transistor or a p-channel transistor. However, when the source region or the drain region of the driving transistor 553 is connected to the anode of the light-emitting element 554, the driving transistor 553 is preferably a p-channel transistor. Additionally, when the source region or the drain region of the driving transistor 553 is connected to the cathode of the light-emitting element 554, the driving transistor 553 is preferably an n-channel transistor.

In addition, the switching transistor 552 and the driving transistor 553 may have not only a single-gate structure, but also a multi-gate structure such as a double-gate structure, a triple-gate structure, or the like.

Note that this embodiment describes a structure of an active matrix light-emitting device; however, the display device of the present invention can be a passive matrix light-emitting device in which pixels do not include a switching element.

This embodiment can be implemented in combination with any of embodiment modes and Embodiment 1.

Embodiment 4

This embodiment mode will describe a structure of the semiconductor device of the present invention.

Figure 15A:
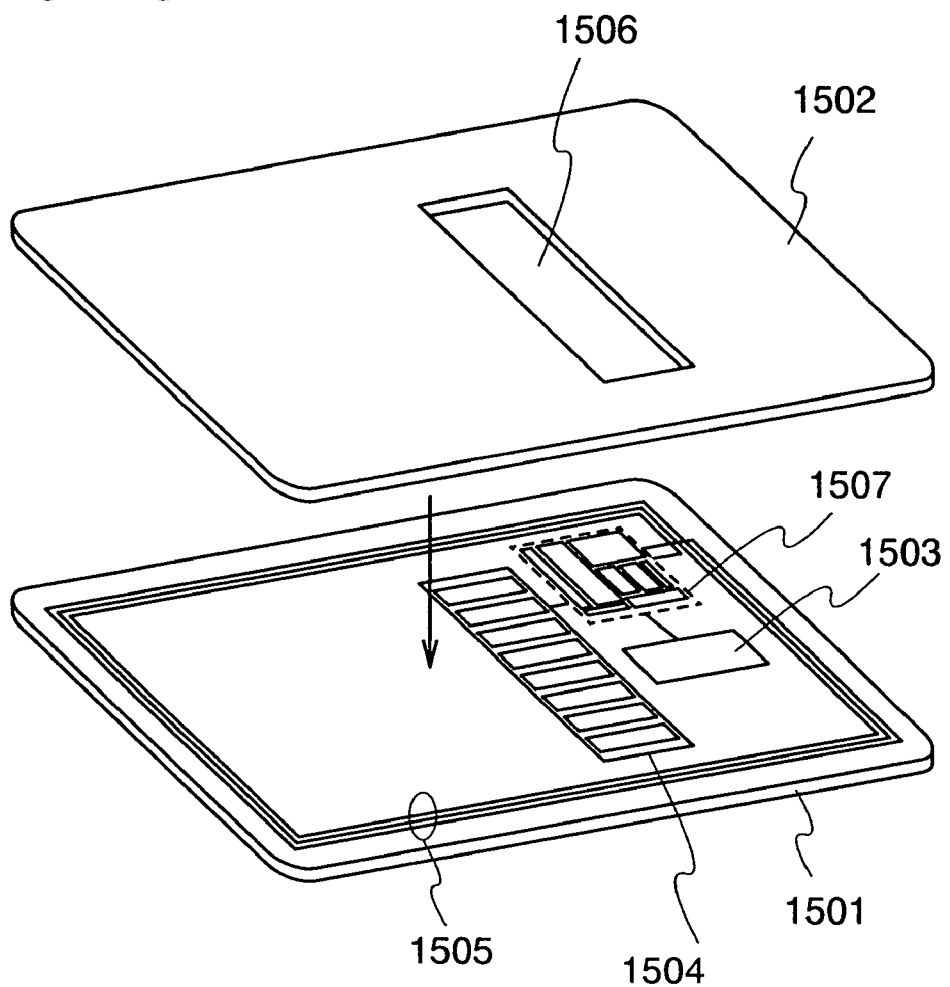
FIGS. 15A and 15B are perspective views each illustrating a structure a of semiconductor device the present invention.

A semiconductor device shown in FIG. 15A has a substrate 1501 and a cover material 1502. The substrate 1501 includes an integrated circuit 1507, a battery 1503, a transmission medium 1504, and a coiled antenna 1505. The integrated circuit 1507 and the transmission medium 1504 may be provided over the substrate 1501 or may be formed separately and attached to the substrate thereafter. In addition, in this embodiment, a structure shown in Embodiment Mode 9 is applied to the transmission medium 1504; however, this embodiment is not limited to the structure. A structure illustrated in Embodiment Mode 7, 8, 10, or 11 may be applied to the transmission medium 1504. Moreover, this embodiment shows an example of a semiconductor device having the battery 1503; however, the structure of this embodiment can be applied to a semiconductor device without the battery 1503.

The cover material 1502 is attached to the substrate 1501 so as to cover the integrated circuit 1507, the battery 1503, and the antenna 1505. In this embodiment an opening 1506 is formed in a part of the cover material 1502. Then, the cover material 1502 is attached to the substrate 1501 so that the opening 1506 and the transmission medium 1504 are overlapped. Note that in this embodiment, the transmission medium 1504 is exposed to the outside of the semiconductor device by forming the cover material 1502 with an opening; however, the present invention is not limited to the structure. In the case where structures of Embodiment Modes 8 to 10 are applied to the transmission medium 1504, display of the transmission medium 1504 can be watched from the outside of the semiconductor device, without forming the opening 1506, but by using a material having a light transmitting property for the cover material 1502. Furthermore, when structures of Embodiment Mode 8 to 10 are applied to the transmission medium 1504, a material having a light transmitting property may be used only for an overlapped region of the transmission medium 1504 and the cover material 1502.

Note that this embodiment shows an example in which the antenna 1505 is provided over the substrate 1501: however, the present invention is not limited to the structure. The antenna 1505 may be provided on the side of the cover material 1502 so that the antenna 1505 may be electrically connected to the integrated circuit 1507 in attaching the cover material 1502 to the substrate 1501.

Figure 15B:
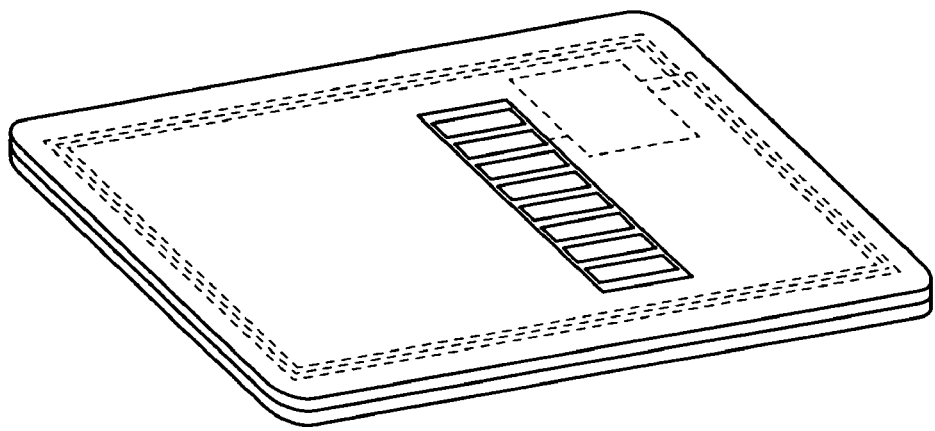

A semiconductor device illustrated in FIG. 15B can be obtained by overlapping the substrate 1501 and the cover material 1502.

This embodiment can be implemented in combination with any of embodiment modes and Embodiments 1 to 3.

Embodiment 5

This embodiment will describe a structure of a semiconductor device in the present invention.

Figure 16A:
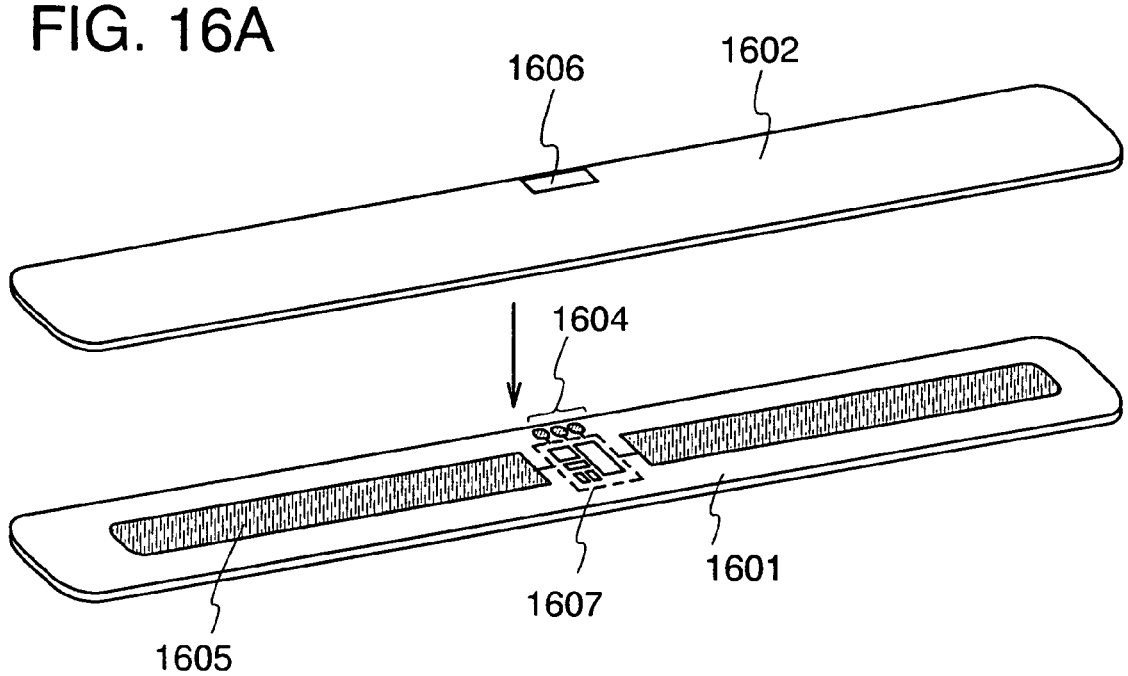
FIGS. 16A and 16B are perspective views each illustrating a structure of a semiconductor device of the present invention.

A semiconductor device shown in FIG. 16A has a substrate 1601 and a cover material 1602. The substrate 1601 includes an integrated circuit 1607, a transmission medium 1604, and a dipole antenna 1605. The integrated circuit 1607 and the transmission medium 1604 may be provided over the substrate 1601 or may be formed separately and attached to the substrate thereafter. In addition, in this embodiment, a structure shown in Embodiment Mode 8 is applied to the transmission medium 1604; however, this embodiment is not limited to the structure. A structure illustrated in Embodiment Mode 7, 9, 10, or 11 may be applied to the transmission medium 1604. Moreover, this embodiment shows an example of a batteryless semiconductor device; however, the structure of this embodiment can be applied to a semiconductor device with a battery.

The cover material 1602 is attached to the substrate 1601 so as to cover the integrated circuit 1607, and the dipole antenna 1605. In this embodiment an opening 1606 is formed in a part of the cover material 1602. Then, the cover material 1602 is attached to the substrate 1601 so that the opening 1606 and the transmission medium 1604 are overlapped. Note that in this embodiment, the transmission medium 1604 is exposed to the outside of the semiconductor device by forming the cover material 1602 with an opening; however, the present invention is not limited to the structure. In the case where structures of Embodiment Mode 7, 9, and 10 are applied to the transmission medium 1604, transmission of the transmission medium 1604 can be watched from the outside of the semiconductor device, without forming the opening 1606, but by using a material having a light transmitting property for the cover material 1602. Furthermore, when structures of Embodiment Mode 7, 9, and 10 are applied to the transmission medium 1604, a material having light transmitting property may be used only for an overlapped region of the transmission medium 1604 and the cover material 1602.

Note that this embodiment shows an example that the dipole antenna 1605 is provided over the substrate 1601: however, the present invention is not limited to the structure. The dipole antenna 1605 may be provided on the side of the cover material 1602, so that the dipole antenna 1605 may be electrically connected to the integrated circuit 1607 in attaching the cover material 1602 to the substrate 1601.

Figure 16B:
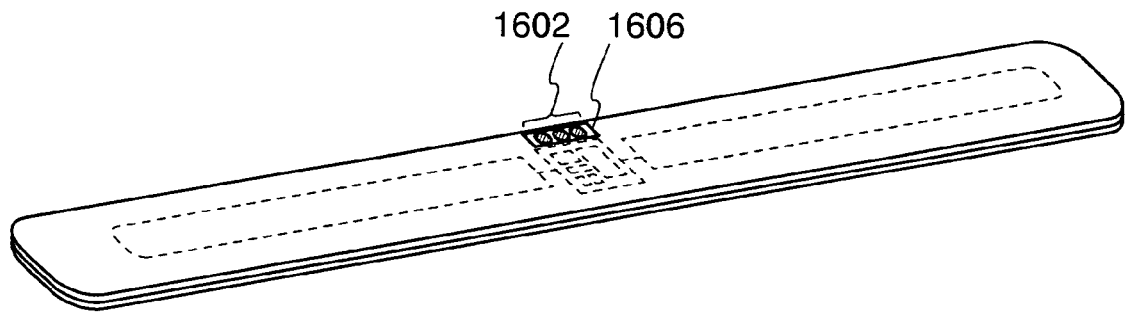

A semiconductor device illustrated in FIG. 16B can be obtained by overlapping the substrate 1601 and the cover material 1602.

This embodiment can be implemented in combination with any of embodiment modes and Embodiments 1 to 3.

Embodiment 6

This embodiment mode will describe a specific structure of an oscillator circuit used in the semiconductor device of the present invention.

Figure 17:
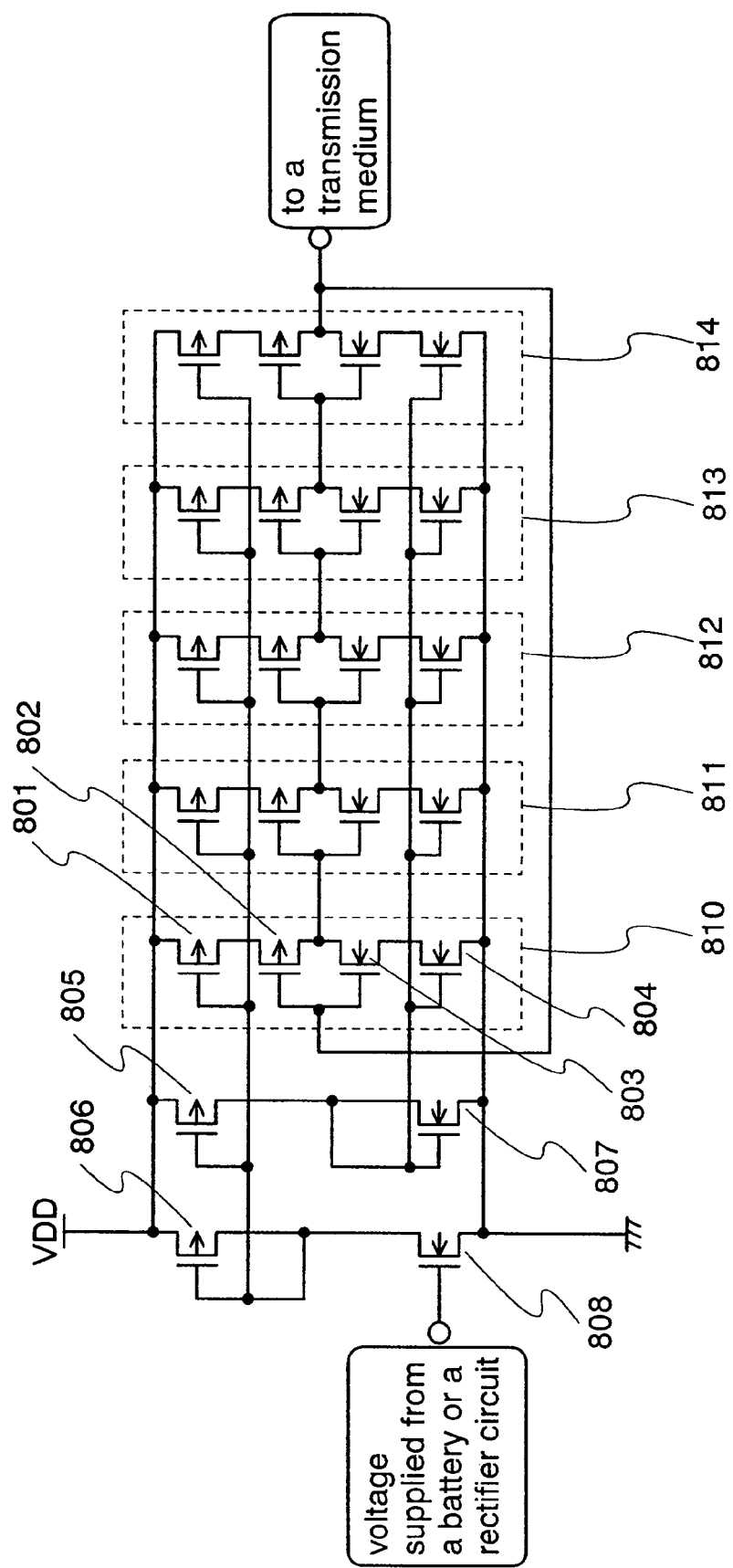
FIG. 17 is a circuit diagram of a voltage controlled oscillator circuit.

FIG. 17 illustrates a circuit diagram of a voltage controlled oscillator circuit which is one of the oscillator circuits. In the voltage controlled oscillator circuit illustrated in FIG. 17, a p-channel transistor (PTr) 801, a p-channel transistor (PTr) 802, an n-channel transistor (NTr) 803, and an n-channel transistor (NTr) 804 are sequentially connected in series. When a circuit 810 having the PTr 801, PTr 802, NTr 803, and NTr 804 is regarded as one stage, the voltage controlled oscillator circuit oscillates when it has odd number of stages, which are more than or equal to three, of the above circuit. The voltage controlled oscillator circuit illustrated in FIG. 17 has five stages of circuits 810 to 814.

Drain regions of the PTr 802 and the NTr 803 in each of the circuits 810, 811, 812, and 813, are connected to gate electrodes of the PTr 802 and the NTr 803 of the next stage. The drain regions of the PTr 802 and the NTr 803 in the circuit 814 of the last stage are connected to gate electrodes of the PTr 802 and the NTr 803 in the circuit 810 of the first stage.

The voltage controlled oscillator circuit illustrated in FIG. 17 has p-channel transistors (PTr) 805 and 806, and n-channel transistors (NTr) 807 and 808. The PTr 805 and the NTr 807 are connected in series, and the PTr 806 and the NTr 808 are connected in series. Additionally, the gate electrode and the drain region of the PTr 806 are connected to each other. Additionally, the gate electrode and the drain region of NTr 807 are connected to each other.

Then, the source region of the PTr 801 in each of the circuits 810 to 814 is connected to the source region of the PTr 805 and the source region of the PTr 806. The gate electrode of the PTr 801 in each of the circuits 810 to 814 is connected to the gate electrode of the PTr 805 and the gate electrode of the PTr 806. The source region of the NTr 804 in each of the circuits 810 to 814 is connected to the source region of the NTr 807 and the source region of the NTr 808. Moreover, the gate electrode of the NTr 804 in each of the circuits 810 to 814 is connected to the gate electrode of the NTr 807.

In the voltage controlled oscillator circuit having the above structure, a higher level of voltage than the ground (VDD) is provided to the source region of the PTr 806. Additionally, the voltage provided to the control circuit from the rectifier circuit or the battery is applied to the gate electrode of the NTr 808. Then, the potential of the drain regions of the PTr 802 and the NTr 803 in the circuit 814 of the last stage is output to a transmission medium as a signal. Note that the signal output from the voltage controlled oscillator circuit may be output to the transmission medium after applied denoising or waveform shaping with a buffer or the like.

Note that when the residual amount of the electrical energy in the battery is transmitted, the voltage provided to the source region of the PTr 806 may be set to be constant without independently of the residual amount of the electrical in the battery by using a regulator or the like.

Frequencies of signals output from the voltage controlled oscillator circuit having the above structure change depending on the voltage provided to the control circuit from the rectifier circuit or the battery. Additionally, the start timing of the driving of the voltage controlled oscillator circuit is controlled with a signal from the signal processing circuit. Specifically, a switching circuit may be provided on the previous stage of the gate electrode of the NTr 808 so that the switching of the switching circuit may be controlled with a signal from the signal processing circuit.

This embodiment can be implemented in combination with any of Embodiment Modes 1 to 7 and Embodiments 4 and 5.

Embodiment 7

This embodiment will describe a specific structure of an oscillator circuit used for the semiconductor device of the present invention.

Figure 18:
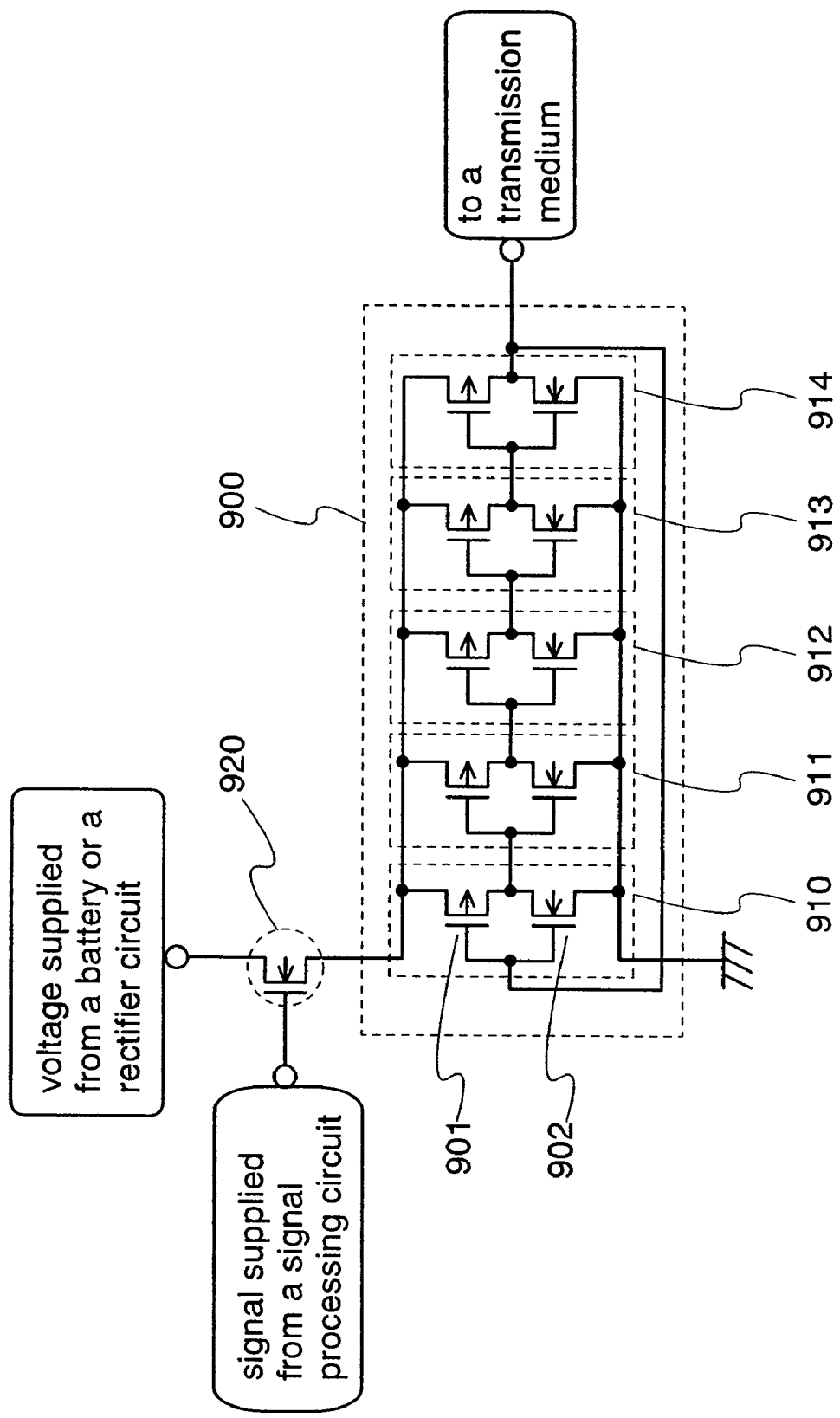
FIG. 18 is a circuit diagram of a ring oscillator.

FIG. 18 illustrates a circuit diagram of a ring oscillator 900 as one example of the oscillator circuit. In the ring oscillator 900 illustrated in FIG. 18, a p-channel transistor (PTr) 901 and an n-channel transistor (NTr) 902 are connected in series. When a circuit 910 having the PTr 901 and NTr 902 is regarded as one stage, the ring oscillator 900 oscillates when it has odd number of stages, which are more then or equal to three, of the above circuits. The ring oscillator circuit illustrated in FIG. 18 has five stages of circuits 910 to 914.

Drain regions of the PTr 901 and the NTr 902 in each of the circuits 910 to 913 are connected to gate electrodes of the PTr 901 and the NTr 902 of the next stage. Drain regions of the PTr 901 and the NTr 902 in the circuit 914 of the last stage are connected to gate electrodes of the PTr 901 and the NTr 902 in the circuit 910 of the first stage. A source region of the PTr 901 in each of the circuits 910 to 914 is connected to a drain region of an n-channel transistor which a switching circuit 920 has. Additionally, the ground potential is provided to the source region of the NTr 902 in each of the circuits 910 to 914.

The voltage from the rectifier circuit or the battery is provided to the drain region of the switching circuit 920. Moreover, voltage of a signal from the signal processing circuit is provided to the gate electrode of the NTr 902.

In the ring oscillator 900 having the above structure, the voltage provided to the control circuit from the rectifier circuit or the battery is supplied to the source region of the PTr 901 via the switching circuit 920. Then, the potential of the drain regions of the PTr 901 and the NTr 902 in the circuit 914 of the last stage is output to a transmission medium as a signal. Note that the signal output from the ring oscillator 900 may be output to the transmission medium after applied denoising or waveform shaping with a buffer or the like.

In the ring oscillator 900 having the above structure, assuming that a rising propagation delay of the potential of the drain regions of the PTr 901 and the NTr 902 is $t_{PLH}$, a falling propagation delay thereof is $t_{PHL}$, and the number of stages of the circuit having the PTr 901 and the NTr 902 is n, a frequency F of output signals can be represented $F=1/\{n\times t_{PLH}+t_{PHL}\}$. The propagation delay depends on the voltage from the rectifier circuit or the battery. Thus, as the voltage level is high, the propagation time becomes short, and the frequency F of the output signal becomes high. In addition, the delay time also depends on the resistance or a capacitor of the PTr 901 and the NTr 902. Therefore, circuit designers can optimize the size or the number of stages of circuits having the PTr 901 and the NTr 902 as appropriate in order to obtain a signal having a desired frequency.

Note that in this embodiment, the switching circuit 920 is provided between the rectifier circuit or the battery, and the ring oscillator 900; however, the present invention is not limited to the structure. The switching circuit 920 may be provided between the ground and the source region of the NTr 902 in each of the circuits 910 to 914. In this case, the voltage from the rectifier circuit or the battery is provided directly to the source region of the PTr 901 in each of the circuits 910 to 914.

This embodiment can be implemented in combination with any of Embodiment Modes 1 to 7 and Embodiments 4 and 5.

Embodiment 8

This embodiment will describe a specific structure of a sample-and-hold circuit used for the semiconductor device of the present invention.

Figure 19:
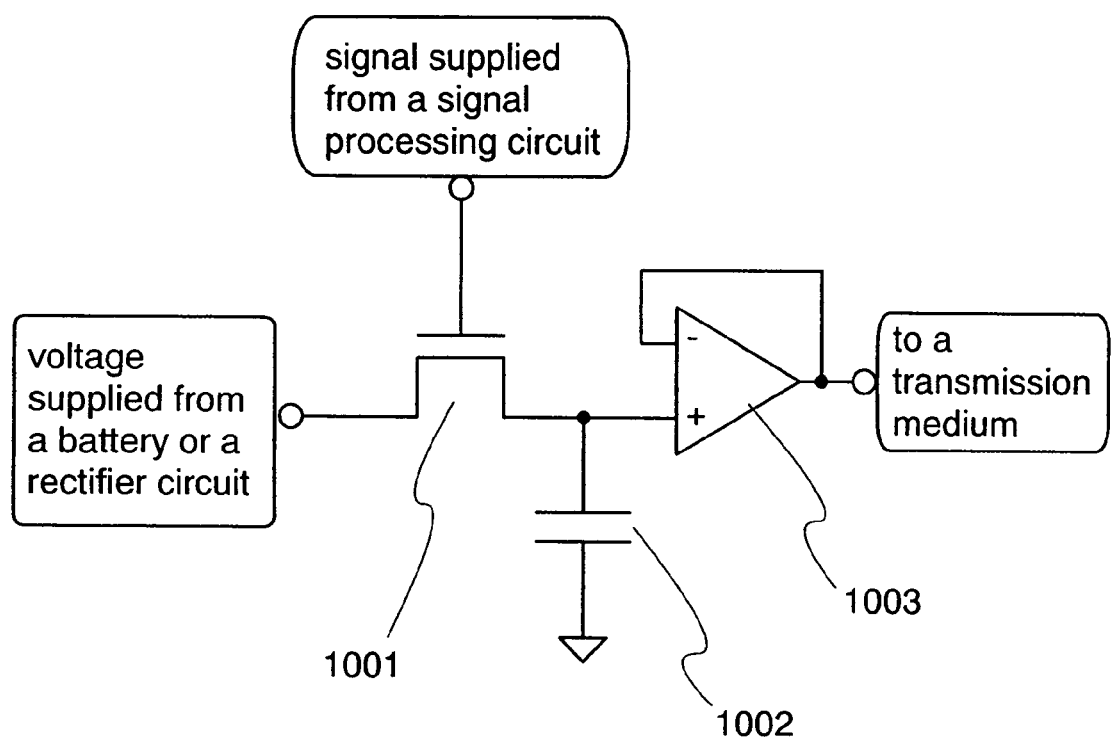
FIG. 19 is a circuit diagram of a sample-and-hold circuit.

The sample-and-hold circuit illustrated in FIG. 19 has a transistor 1001, a capacitor 1002, and an amplifier 1003. The voltage from the rectifier circuit or the battery is provided to one of the source region and the drain region of the transistor 1001. The other of the transistor 1001 is connected to an electrode of the capacitor 1002 and a noninverting input terminal of the amplifier 1003. Voltage of a signal from the signal processing circuit is provided to the gate electrode of the transistor 1001. The noninverting input terminal of the amplifier 1003 is connected to the output terminal thereof. The potential of the output terminal of the amplifier 1003 is transmitted to the transmission medium as a signal.

This embodiment can be implemented in combination with any of Embodiment Modes 1 to 6 and 8, and Embodiments 4 and 5.

This application is based on Japanese Patent Application serial no. 2006-307298 filed in Japan Patent Office on 14, Nov. 2006, the entire contents of which are hereby incorporated by reference.

What is claimed is:

1. A semiconductor device comprising:
   an antenna configured to receive a radio wave;
   a battery;
   a control circuit configured to detect a voltage output from the battery in accordance with a first signal generated by the antenna, and generate a second signal having information about a residual amount of electrical energy in the battery; and
   a transmission medium configured to emit the second signal as one of an elastic wave whose frequency is outside of an audible frequency range, an ultraviolet light and an infrared light,
   wherein the detection of the voltage output from the battery and the generation of the second signal can be performed by using power of the first signal.

2. The semiconductor device according to claim 1, wherein the battery is one of a primary battery and a secondary battery.

3. The semiconductor device according to claim 1, wherein the control circuit comprises an oscillator circuit configured to control a frequency of the second signal.

4. The semiconductor device according to claim 1, wherein the antenna is a coiled antenna or a dipole antenna.

5. The semiconductor device according to claim 1, wherein the second signal is configured to be received by a device for displaying the information about the residual amount of electrical energy in the battery.

6. A semiconductor device comprising:
   an antenna configured to receive a radio wave;
   a control circuit configured to generate, in accordance with a first signal generated by the antenna, a second signal having communication distance information of the semiconductor device; and
   a transmission medium configured to emit the second signal as one of an elastic wave whose frequency is outside of an audible frequency range, an ultraviolet light and an infrared light, and
   wherein the generation of the second signal can be performed using power of the first signal.

7. The semiconductor device according to claim 6, wherein the control circuit comprises an oscillator circuit configured to control a frequency of the second signal.

8. The semiconductor device according to claim 6, wherein the antenna is a coiled antenna or a dipole antenna.

9. The semiconductor device according to claim 6, wherein the second signal is configured to be received by a device for displaying the communication distance information of the semiconductor device.

* * * * *